(12) United States Patent
Chavan et al.

(10) Patent No.: US 11,868,348 B2
(45) Date of Patent: Jan. 9, 2024

(54) HARDWARE FRIENDLY KEY VALUE TABLE DESIGN TO SUPPORT RELATIONAL HASH JOIN

(71) Applicant: Oracle International Corporation, Redwood Shores, CA (US)

(72) Inventors: Shasank Kisan Chavan, Menlo Park, CA (US); James Kearney, Cambridge, MA (US); Weiwei Gong, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/018,694

(22) Filed: Sep. 11, 2020

(65) Prior Publication Data

US 2021/0081417 A1 Mar. 18, 2021

Related U.S. Application Data

(60) Provisional application No. 62/899,587, filed on Sep. 12, 2019, provisional application No. 62/899,589, filed on Sep. 12, 2019, provisional application No. 62/899,603, filed on Sep. 12, 2019.

(51) Int. Cl.
*G06F 16/2453* (2019.01)
*G06F 16/22* (2019.01)

(52) U.S. Cl.
CPC .... *G06F 16/24537* (2019.01); *G06F 16/2255* (2019.01)

(58) Field of Classification Search
CPC .................. G06F 16/24537; G06F 16/2255
See application file for complete search history.

(56) References Cited

U.S. PATENT DOCUMENTS

| 9,275,110 B2 | 3/2016 | Pradhan |
| 10,162,678 B1 | 12/2018 | Stafford |
| 10,545,917 B2 | 1/2020 | Dageville et al. |
| 11,288,274 B1 * | 3/2022 | Alsaadi ................. G06F 16/278 |

(Continued)

FOREIGN PATENT DOCUMENTS

WO WO2015099562 A1 7/2015

OTHER PUBLICATIONS

AI.Repository, https://www.cs.cmu.edu/Groups/AI/html/cltl/clm/node154.html#:~:text=Hash%20tables%20come%20in%20three,tree%20structure%20(using%20equal). (Year: 2020).*

(Continued)

*Primary Examiner* — Mark D Featherstone
*Assistant Examiner* — Kweku William Halm
(74) *Attorney, Agent, or Firm* — Hickman Becker Bingham Ledesma LLP; Brian N. Miller

(57) ABSTRACT

The present invention relates to join acceleration. In an embodiment, a computer receives a request for a relational join of build data rows with probe data rows. Based on the request for the relational join, a particular kind of data map from many kinds of data map that can implement the relational join is dynamically selected. Based on the build data rows, an instance of the particular kind of data map is populated. A response is sent for the request for the relational join that is based on the probe data rows and the instance of the particular kind of data map.

20 Claims, 11 Drawing Sheets

(56) References Cited

U.S. PATENT DOCUMENTS

| | | | | |
|---|---|---|---|---|
| 2003/0065688 | A1* | 4/2003 | Dageville | G06F 16/24561 |
| 2003/0204698 | A1* | 10/2003 | Sachedina | G06F 16/2255 |
| | | | | 711/170 |
| 2006/0117036 | A1* | 6/2006 | Cruanes | G06F 16/2456 |
| 2006/0143168 | A1* | 6/2006 | Rossmann | G06F 16/9014 |
| 2008/0235488 | A1* | 9/2008 | Ross | G06F 12/0897 |
| | | | | 711/216 |
| 2011/0307659 | A1* | 12/2011 | Hans | H03M 7/3084 |
| | | | | 711/E12.001 |
| 2012/0011108 | A1 | 1/2012 | Bensberg et al. | |
| 2013/0318067 | A1* | 11/2013 | Sukhwani | G06F 16/2456 |
| | | | | 707/E17.017 |
| 2014/0013077 | A1* | 1/2014 | Ganesh | G06F 15/8007 |
| | | | | 712/22 |
| 2014/0250142 | A1* | 9/2014 | Pradhan | G06F 16/2456 |
| | | | | 707/765 |
| 2014/0310307 | A1 | 10/2014 | Levy et al. | |
| 2015/0039626 | A1* | 2/2015 | Sen | G06F 16/2255 |
| | | | | 707/747 |
| 2015/0039627 | A1* | 2/2015 | Sen | G06F 16/2255 |
| | | | | 707/747 |
| 2016/0248583 | A1* | 8/2016 | McClanahan | G06F 21/78 |
| 2016/0275078 | A1* | 9/2016 | Attaluri | G06F 16/2255 |
| 2017/0255675 | A1* | 9/2017 | Chavan | G06F 16/24562 |
| 2017/0255676 | A1 | 9/2017 | Attaluri | |
| 2017/0300592 | A1* | 10/2017 | Breslow | G06F 16/9014 |
| 2018/0004809 | A1 | 1/2018 | Ramesh et al. | |
| 2018/0081946 | A1* | 3/2018 | Bondalapati | G06F 16/2456 |
| 2019/0197159 | A1 | 6/2019 | Balkesen et al. | |
| 2019/0303482 | A1* | 10/2019 | Balkesen | G06F 16/24561 |
| 2019/0377813 | A1* | 12/2019 | Funke | G06F 16/2456 |
| 2020/0125368 | A1* | 4/2020 | Kaldewey | G06F 16/2255 |
| 2021/0073221 | A1 | 3/2021 | Chavan | |
| 2021/0081410 | A1 | 3/2021 | Chavan | |

OTHER PUBLICATIONS

AI.Repository@cs.cmu.edu hereinafter AI.Repository (Year: 2001).*

Song et al., "Fast hash table lookup using extended bloom filter: an aid to network processing" SIGCOMM '05: Proceedings of the 2005 conference on Applications, technologies, architectures, and protocols for computer communications. https://doi.org/10.1145/1080091.1080114 (Year: 2005).*

NPL Search in ACM Digital Database (Year: 2005).*

Wang, Wendy, et al., "Investigating Memory Optimization of Hash-Index for Next Generation Sequencing on Multi-Core Architecture", 2012 IEEE 26th IP&DPSW, pp. 665-674, downloaded May 13, 2021, 10 pgs.

Balkesen, U.S. Appl. No. 15/944,473, filed Apr. 3, 2018, Notice of Allowance dated May 27, 2020.

Balkesen, U.S. Appl. No. 15/944,473, filed Apr. 3, 2018, Office Action dated Jan. 27, 2020.

Balkesen, U.S. Appl. No. 15/852,038, filed Dec. 22, 2017, Notice of Allowance dated Nov. 5, 2019.

Zhou et al., "Implementing Database Operations Using SIMD Instruction", ACM SIGMOD dated Jun. 4-6, 2002, Madison, Wisconsin, USA, 12.

Zhang et al., "Strategies for Using Additional Resources in Parallel Hash-based Join Algorithms", dated 2004, 10 pages.

Martin et al., "Parallel Hash-Based Join Algorithms for a Shared-Everything Environment", dated Sep. 23, 1996, 43 pages.

C. Balkesen et al.. "Main-memory hash joins on multi-core CPUs: Tuning to the underlying hardware," 2013 IEEE 29th International Conference on Data Engineering, pp. 362-373.

Begley et al. "MCJoin: A Memory-constrained Join for Column-Store Main-memory Databases", dated 2012, ACM SIGMOD International Conference on Management of Data (SIGMOD '12), pp. 121-132.

Alcantara et al., "Real-Time Parallel Hashing on the GPU", dared 2009, 9 pages.

* cited by examiner

FIG. 1

COMPUTER 100

BUILD DATA ROWS 110

| ROW | FIELD 120 | OTHER FIELDS |
|---|---|---|
| B1 | A | |
| B2 | B | |
| B3 | A | |

PROBE DATA ROWS 130

| ROW | FIELD 140 | OTHER FIELDS |
|---|---|---|
| P1 | B | |
| P2 | A | |
| P3 | A | |

REQUEST 150
JOIN BUILD.FIELD = PROBE.FIELD

HASH TABLE 170

| BUCKET | LOCATION | BUILD KEY | ELEMENT |
|---|---|---|---|
| Y | 0 | A | B1 |
| | 1 | A | B3 |
| Z | 0 | B | B2 |
| | 1 | | |

HASH TABLE 171

| BUCKET | LOCATION | BUILD KEY | INDICATION |
|---|---|---|---|
| W | 0 | A | P...P001 |
| | 1 | C | P...P111 |
| X | 0 | B | R...RRR0 |
| | 1 | | 0...0000 |

RESPONSE 180

| |
|---|
| P1xB2 |
| P2xB1 |
| P2xB3 |
| P3xB1 |
| P3xB3 |

US 11,868,348 B2

HARDWARE FRIENDLY KEY VALUE TABLE DESIGN TO SUPPORT RELATIONAL HASH JOIN

BENEFIT CLAIMS

This application claims the benefit of the following provisional applications, the entire contents of which are hereby incorporated by reference as if fully set forth herein, under 35 U.S.C. § 119(e):

Provisional Appln. 62/899,589, filed Sep. 12, 2019;
Provisional Appln. 62/899,603, filed Sep. 12, 2019; and
Provisional Appln. 62/899,587, filed Sep. 12, 2019.

FIELD OF THE INVENTION

The present invention relates to relational join acceleration. Herein are optimized techniques and hash tables for joining row sets.

BACKGROUND

Join queries are widespread in relational database management systems (RDBMS). Join queries combine rows from two or more database tables based on a set of related join key columns. Herein, a join key may be a column, such as in a relational table or column family, that participates in the predicate of a relational join such as an equijoin. The join key may or may not be a candidate key of the database table that contains the column or of any other database table or part of a compound candidate key. A candidate key is a primary key, a secondary key, or any other key that uniquely identifies rows. A join of two database tables can be carried out by processing the columns of one of the database tables, known herein as a build table, into a data structure during a Build phase, and subsequently using the join key column of the remaining database table, known herein as a probe table, to probe the data structure for matches during a Probe phase. For example, a hash join populates a hash table during the build phase by applying a hash function to the build key values. Making a match of a row of the build table to a row of the probe table is known herein as matchmaking, which occurs during the probe phase.

Join operations are extensively used in structured query language (SQL) processing. One widely used class of techniques for implementing joins is to create a hash table that indexes one of the join operands, followed by probing into this hash table with another join operand. A typical implementation of this technique probes for each value sequentially (i.e. a row at a time), as each record is processed.

This method of probing the hash table sequentially, one row at a time, for each row in the probe table is inefficient, especially when applied to in-memory columnar data such as vectorized data, and does not take advantage of the attributes and capabilities of modern computer system central processing units (CPUs) and memory controllers.

Hash Join is an important operator for an RDBMS supporting analytic workloads, such as reporting and data mining, because schema normalization usually imposes a multidimensional data topology such as a star or a snowflake for data warehousing that may entail multiple joins for typical processing. To support hash join, a hash table is usually built to join the data from two tables with similar join keys such as for an equijoin. However, there are some difficulties for an efficient hash table data structure and algorithm:

It may be difficult or impossible to accurately predict join selectivity and build table cardinality, which may be crucial factors to estimate the hash table's data distribution as a preface to establishing the hash table's initial capacity.

Resizing a hash table is usually expensive. The more data that has been inserted, the more expensive is the resizing. Also, it is undesirable to pause an insertion while resizing the hash table.

Probing the hash table usually takes most of the query processing time, because the probe table usually has more rows than the build table. Hash table formats of other approaches are unsuitable for accelerated probing and thus are inefficient.

Generally, other approaches involve data structures, formats, and algorithms that were designed for computational styles and hardware that are outdated.

BRIEF DESCRIPTION OF THE DRAWINGS

In the drawings:

FIG. 1 is a block diagram that depicts an example computer that joins data rows based on optimized arrangement and operation of a hash table;

DETAILED DESCRIPTION

Figure 2:
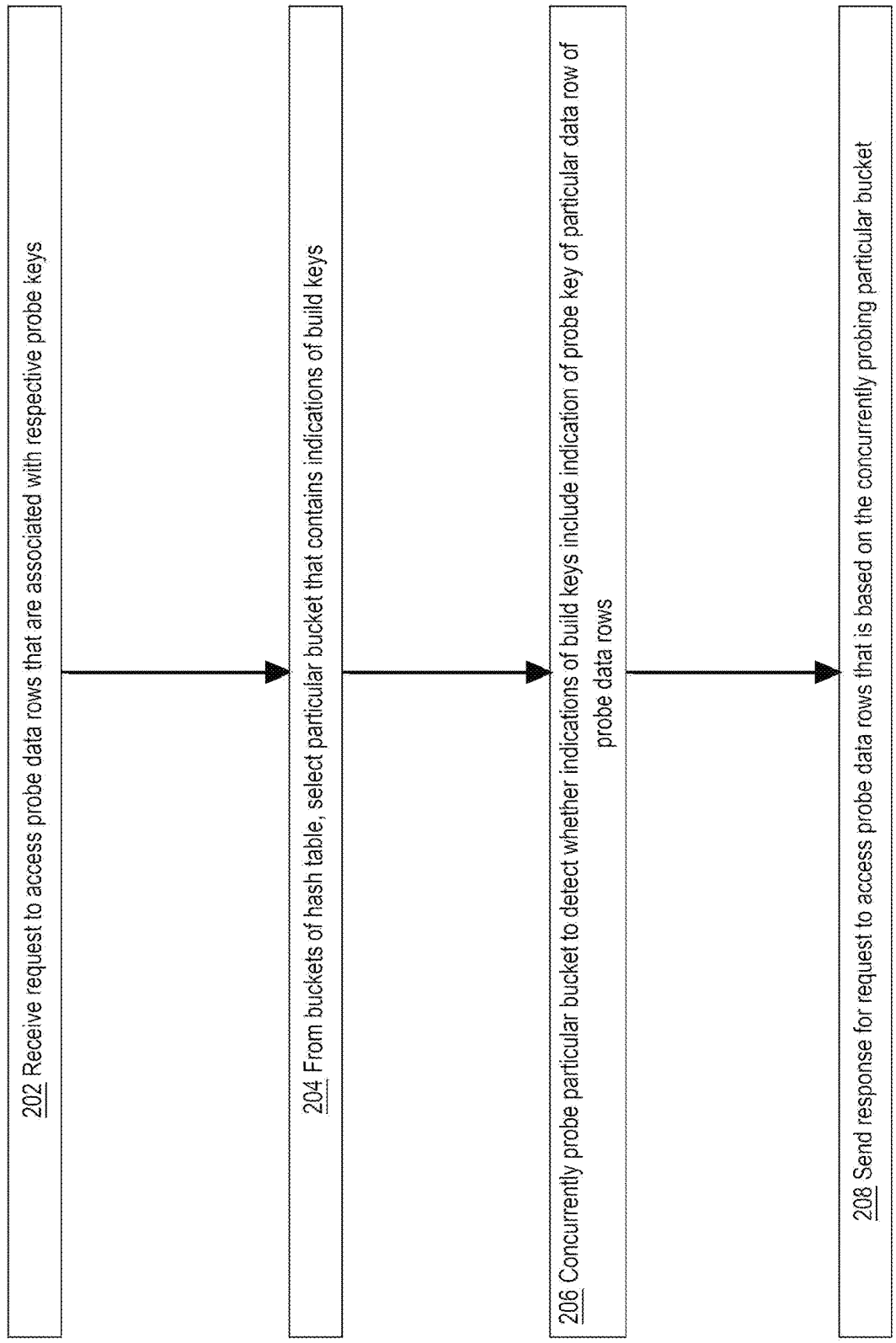
FIG. 2 is a flow diagram that depicts an example hash table probing process.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Herein are novel execution techniques for a relational join with acceleration over other approaches. Several techniques that make efficient use of central processing unit (CPU)

vectorized processing capabilities to build and probe hash tables are described, with application to in-memory columnar structured query language (SQL) database query processing.

The described algorithms meld the inherently parallel nature of columnar data and the vector capabilities of modern CPUs to build and probe hash tables more efficiently than previous implementations. In addition, they make better use of wide registers, superscalar execution, and memory hierarchy behaviors that are characteristic of current computer architectures.

Herein are techniques for building and probing a hash table in an accelerated way for a tabular database such as a relational database and with additional optimization for columnar data such as with a columnar database. In prior techniques, hash table probe is done usually one key value at a time, one bucket at a time, one value lookup at a time, etc. That is sequential processing, which leads to sub-par performance. The algorithms proposed herein have optimized batched probing into a hash table. Thus, most or all operations upon data vectors are performed by processing multiple values at a time, not one value at a time.

In an embodiment, various single instruction multiple data (SIMD) instructions can be used to perform the probe phase of a join operation in parallel. In one embodiment, sixteen-key probes are performed in parallel in just a few compact sequences of instructions using SIMD. Novel parallelized probing of a hash table using SIMD instructions is two or three times faster than other probing approaches.

Construction of the hash table used for the probe phase of a join is also optimized herein. Sometimes building a hash table is more expensive than probing. Consequently, acceleration of the build phase using the techniques described herein is greatly beneficial. Techniques herein parallelize the build with both of coarse-grained parallelism with threads and fine-grained parallelism using SIMD. Coarse-grained parallelism such as task parallelism and fine-grained parallelism such as data parallelism shall be described in greater detail hereafter. Novel parallelized building of a hash table using SIMD instructions is two or three times faster than other build phase approaches.

Techniques herein are applicable to data organizing operations by a database system such as a relational join, but also other kinds of organizing operations such as grouping and binning. Approaches herein match, group, or count structured data such as a one-dimensional vector of values or a column of a database table or of some other row set. Such a participating column or vector is known herein as a key. Thus, a key is an ordered or unordered set of values that are known herein as key values. For example, July may be a key value stored in a month column of a database table that is being grouped by month. In that case, the key is the month column that is a grouping key.

Hash tables and other kinds of maps herein may be used for matchmaking of separate data items that should be contextually related such as for a relational join. In an embodiment, a hash table records which key values occur in a dataset such as a one-dimensional vector such as a column of a database. In an embodiment, the hash table additionally: a) counts duplicate key values or accumulates other statistics and/or b) retains references to, or values from, source items such as rows of a table or other row set. In such cases, the hash table can be used to obtain a value such as a count, a flag, or an array of row identifiers, based on a key value. Herein, those mapped-to values, whether key values, other original or derived scalar values, or data structures, are known as entries.

In an embodiment, during the build phase of a hash join, a computer receives a request to access build data rows that are each associated with a respective build key value. From multiple buckets of a hash table, a particular bucket is selected that contains entries of multiple respective build key values in respective locations within the particular bucket. Whether or not the particular bucket contains an entry of the build key value of a particular build data row is detected. Multiple locations within the particular bucket are concurrently inspected to find an empty location in which to store the entry of the build key value of the particular data row. For the request to access the build data rows, a response is sent that is based on the hash table.

In an embodiment, during a probe phase of a hash join, a computer receives a request to access probe data rows that are each associated with a respective probe key value. From multiple buckets of a hash table, a particular bucket is selected that contains entries of multiple respective build key values. The particular bucket is concurrently probed to detect whether or not the entries in the particular bucket includes an entry of the probe key value of a particular data row. For the request to access the probe data rows, a response is sent that is based on the concurrent probing of the particular bucket.

In an embodiment, a computer receives a request for a relational join of build data rows with probe data rows. Based on the request for the relational join, a particular kind of data map from many kinds of data map that can implement the relational join is dynamically selected. Based on the build data rows, an instance of the particular kind of data map is populated. A response is sent for the request for the relational join that is based on the probe data rows and the instance of the particular kind of data map.

1.0 Example Computer

FIG. 1 is a block diagram that depicts an example computer 100, in an embodiment. Computer 100 joins data rows 110 and 130 based on optimized arrangement and operation of hash table 170. Computer 100 may be at least one rack server such as a blade, a personal computer, a mainframe, a virtual computer, or other computing device. When computer 100 comprises multiple computers, the computers are interconnected by a communication network.

In various embodiments, computer 100 provides access to a bulk datastore such as a relational database, a graph database, a NoSQL database, a column datastore, a tuple datastore such as a resource description framework (RDF) triplestore, a key value datastore, or a document datastore such as for documents that contain JavaScript object notation (JSON) or extensible markup language (XML). In any case, the datastore may be managed by software such as an application or middleware such as a database management system (DBMS). Data stored in the datastore may reside in volatile and/or nonvolatile storage.

In this example, data is organized as fields such as 120, 140, and other fields as shown. In this example, fields may have a tabular arrangement that is logical and/or physical such that fields are arranged as one record per row and one field per column. For example, data rows 110 and 130 may each be a relational table, a column family, or an internal row set such as an intermediate result. For example, build data rows 110 contains rows B1-3.

A and B are example values of fields 120 and 140 that may be stored in volatile and/or nonvolatile storage. In operation, computer 100 receives or generates request 150 to read and/or write data in the datastore. In embodiments, request 150 is expressed as data manipulation language (DML) such as a create read update delete (CRUD) statement or query by example (QBE). For example, request 150 may be a structured query language (SQL) DML statement such as a query. In an embodiment, request 150 is received through open database connectivity (ODBC).

1.1 Join Processing Using a Hash Table

Depending on the example, request 150 may directly specify (as shown) a relational join between data rows 110 and 130 or otherwise cause such a join to implicitly occur such as by invoking a database view or stored procedure whose implementation includes such a join. Although a single field equijoin is shown, other joins are possible such as a join based on multiple fields, inequality, and/or including null. As shown, request 150 specifies "build.field=probe.field" that entails a join of data rows 110 and 130 based on equality of fields 120 and 140.

Computer 100 executes a join for request 150 in a build phase followed by a probe phase. The build phase populates hash table 170 based on build data rows 110. The build phase entails iterating through values in field 120. For example, build data rows 110 may be a relational table whose rows B1-B3 are iterated during a table scan to access content of field 120. In another example, field 120 is available as a one-dimensional vector such as in random access memory (RAM). Thus, it does not matter whether build data rows 110 are available in row major or column major form.

Hash table 170 contains a fixed or increasing amount of buckets such as Y-Z. Each bucket Y-Z contains a same fixed amount of locations such as 0-1 that may be zero based offsets into a bucket content array of the bucket. For example, the bucket and the bucket content array may be a same object. The location column in hash table 170 may be implied and not actually stored.

Locations 0-1 are distinct offsets within same bucket Y and should only be used for same bucket Y. For example, multiple locations 0 in buckets Y-Z are separate locations that are not interchangeable. Computer 100 is careful not to calculate a location in bucket Y and then use that calculated location for access into other bucket Z.

The build phase concurrently enumerates field 120 values A, B, A of respective rows B1-3. Each value occurrence in that set of values has an opportunity to: a) insert a distinct or duplicate, depending on the scenario, entry of a build key value into hash table 170, and/or b) assign or revise an element in hash table 170. The structure of the entry depends on the scenario as discussed later herein. For example, the entry may or may not be the build key value as shown.

Initially in this example, hash table 170 may contain empty locations 0-1 in buckets Y-Z. For example, location 1 of bucket Z is empty as shown. When the build phase encounters value A of field 120 for row B1, various activities may occur depending on the scenario such as follows.

As explained above, hash table 170 contains an array of buckets Y-Z. For example, Y-Z may be offsets into that array of buckets. In embodiments, buckets Y-Z are or are not contiguous in memory. In embodiments, locations 0-1 in same bucket Y are or are not contiguous in memory.

Value A may operate as a hash code or as an input to a hash function that calculates the hash code. Some or all bits of the hash code may be used as an offset into the array of buckets to identify a bucket. Value A hashes to bucket Y as shown.

After bucket Y is identified, various other activities may occur depending on the scenario such as follows. An entry of value A may be stored as the build key value in a first empty location that initially may be location 0. In this example, the entry may contain directly or indirectly by reference to a data structure: a) value A, b) the hash code, c) an identifier or pointer to row B1, as shown in the element column, and/or d) other data such as other fields of row B1.

Duplicate build key values may be ignored or processed as follows. For example, the entry in location 0 in bucket Y may additionally or instead contain a count of how many times does value A occur in field 120. In this example, value A occurs again for row B3 and again hashes to same bucket Y. As shown, value A and row identifier B3 are stored as shown into the next empty location in bucket Y that may be location 1.

Value B of row B2 hashes to bucket Z as shown. Different hash codes and/or build key value values may map to same or different buckets. When the build phase finishes, contents of the build key column and element column are as shown. Thus when the build phase finishes, population of hash table 170 is complete, and the probe phase may start.

The probe phase matches rows of probe data rows 130 to rows of build data rows 110 by matching values of field 140 to values of field 120 as follows. The probe phase concurrently enumerates field 140 values B, A, A of respective rows P1-3. Each value occurrence in that set of values has an opportunity as a probe key value to match a build key value in hash table 170. For example, value B of row P1 hashes to bucket Z and matches build key value B in location 0.

Other join approaches may entail linear scanning during the build phase and/or the probe phase, which is slow. Techniques herein do not linearly scan. Thus, joins herein are accelerated.

As explained above, bucket Y may contain duplicate build key values A. Each occurrence of a same probe key value may match duplicate build key values. For example, value A has duplicates in fields 120 and 140. For example, the join results are shown as response 180 that contains pairings of an identifier of a row of build data rows 110 with an identifier of a row of probe data rows 130.

For example, probe row P2 has value A that matches build rows B1 and B3 per hash table 170. Thus, response 180 contains P2×B1 and P2×B3. In this example, response 180 is a final result that answers request 150 and contains the join results. In another example, the join results are an intermediate result, and response 180 is based on, but does not contain, the join results.

In various examples, the elements of hash table 170, the join results, and the response may entail various amounts of materialization such as projection. For example, some of the other fields of data rows 110 and 130 may be payload columns that may or may not be included in the join result and/or response 180. Some of the other fields of build data rows 110 may or may not be included in elements of hash table 170.

So long as row identifiers or primary keys are included in the join result and/or in the elements of hash table 170, materialization of additional columns not directly involved with matchmaking may be deferred until various later stages of execution of request 150. For example, additional columns may be needed for projection, and all of the additional columns may be unmaterialized until response 180 is generated. Join results may contain row identifiers of build data rows 110 and/or row identifiers of probe data rows 130, or neither.

1.1 Row Identifiers and Duplicates

Implementation of row identifiers that uniquely identify individual rows depends on the embodiment. Such implementations may include: a) more or less persistent ROWIDs such as physical storage identifiers or locators, b) volatile row identifiers such as volatile pointers such as memory addresses or array offsets, or c) candidate keys. Candidate keys may be simple or compound. The primary key of a table may be a be a candidate key, for example. Different row sets may have different row identifier implementations.

For example, a durable table may have ROWIDs with an embedded disk block number such as a logical block address (LBA) and byte offset, while a volatile table such as for intermediate results may instead use pointers as row identifiers. If memory addresses are aligned to units larger than the minimum addressable (usually a byte), then least significant bits of pointers may be truncated such that unused bits are implied and: a) repurposed for bitfields with non-addressing semantics, or b) not stored such as for bit packing multiple pointers into less space.

In an embodiment, a volatile row identifier is valid only until the row is evicted from cache. For example, when the row is later reloaded into cache in a same database session, the row is reassigned a different volatile row identifier. In an embodiment, a persistent row identifier is only somewhat permanent. For example, compaction of a durable table may cause a persistent row to move from one disk block to another, which may reassign a different ROWID to the row.

As shown and explained earlier herein, hash table 170 may store build key entries that include the build key value and/or element columns of hash table 170. As shown, locations 0-1 in bucket Y contains respective occurrences B1 and B3 of same build key value A. In other words, hash table 170 needs a separate location in a same bucket for each duplicate occurrence of a same build key value, which may be inefficient. For example, many duplicates may cause bucket Y to overflow as discussed later herein.

One difference between hash table 170 and hash table 171 is that hash table 171 consolidates all duplicate occurrences of a same build key value into a same build key entry as discussed below. Thus, hash table 171 "clusters" duplicate build key value occurrences. For comparative demonstration, hash table 171 contains a superset of the contents of hash table 170. As shown, hash table 171 contains build key value C that hash table 170 lacks.

The contents of buckets X and Z are alternate memory formats of otherwise identical contents. Likewise, the contents of bucket W is a superset of the contents of bucket Y as explained below.

In the illustrated hash tables 170, and 171, each hash bucket has two "locations": location 0 and location 1. Each location corresponds to a build key entry. For example, location 0 of bucket Y has the build key entry [build key A, element B1] while location 1 of bucket Y has the build key entry [build key A, element B3].

1.2 The Indication Field

In the illustrated embodiment, location 1 of buckets X and Z are empty. In hash table 171, a location in a bucket is empty if all of the bits in the "indication" field of the build key entry at that location are zero. For example, a bucket may be initialized by setting to 0 all bits in the indication field of all locations within the bucket. Within the indication field, 0 . . . 0000 depicts an amount of zeroed bits. The actual number of bits depends on the embodiment.

Build key value B has only one occurrence in each of hash tables 170-171. The build key entry for the build key value B occurs in location 0 of bucket Z in hash table 170. In hash table 171, the build key entry for the build key value B is in location 0 of bucket X. The indication field for the build key entry for build key value B is shown as R . . . RRR0. R . . . RRR0 a set of bits with at least the least significant bit zeroed. Each R in that set of bits is a bit of a RID. RIDs are as discussed later herein. An RID may be a ROWID, that identifies a row of a table or intermediate row set. For example, each RID may be a pointer or an array offset. For example, one hash table may contain pointer RIDs and another hash table may contain offset RIDs for a same or different row set.

Because not all bits of a build key entry that contains a RID in hash table 171 are used for the RID, the RID should have fewer bits than the build key entry because some bit(s) of the build key entry may be needed for other purposes as discussed later herein. For example, a RID may be a truncated pointer with implied bit(s). RIDs, pointers, truncation, and offsets are discussed later herein.

1.3 Handling Build Key Collisions

Bucket W contains build key entries for build key values A and C. In this example, build key values A and C caused a "collision" by producing the same hash code. Although not shown, hash table 170 may have multiple different build key values in the same bucket as a result of hashing collisions. Collisions may cause skew that is not present in the raw data of field 120. Whether caused by bias in a hash function or by data skew in field 120, duplicate build key values and, to a lesser extent, other collisions may be alleviated as follows.

As explained above, location 0 in bucket W contains a build key entry that represents two occurrences B1 and B3 of same build key value A. For duplicates, a few least significant bits of the build key entry are a counter bit field that counts duplicates of that same build key value. Because duplicates involve at least two occurrences of the same build key value, the counter's lowest/initial binary value of 001 as shown represents a count of two. Incrementing the counter from two to three would change the binary value from 001 to 010.

In the indication field of the build key entries in bucket W, the P . . . P are bits of a truncated pointer to an array of RIDs such that the P . . . P shown twice for build key values A and C encode different respective pointers and thus have different bits values. The array of RIDs are for duplicate occurrences of a same build key value. The value of the build key entry's counter bit field denotes how many RIDs are stored in the array that the truncated pointer points to. As discussed later herein, the truncated pointer is a prefix of a pointer that may be extended to become a full pointer by appending a few least significant bits that are implicitly zero.

A RID array has finite capacity, and incrementing a counter bit field may or may not entail reallocating the RID array to have more capacity to store more RIDs. Likewise, a RID array may have excess capacity such that if the RID array has an empty slot, then a new RID of another duplicate occurrence is inserted into that slot, and the counter is incremented, but the truncated pointer remains unchanged in the build key entry. If instead the RID array is already full, then those existing RIDs are copied from the RID array to a larger RID array.

The new RID is also stored in the new RID array. The old RID array is discarded or returned to a pool for reuse, and the truncated pointer in the build key entry is reassigned to point to the new RID array. In any case, the counter bit field in the build key entry is incremented.

1.4 Handling Counter Bit Overflows

As explained above, the counter bit field in the indication field counts how many RIDs are stored in the RID array for that indication. Overflow of the counter bit field is avoided as follows. When the counter is incremented to a maximum binary value of all ones as shown for build key value C, then the following occurs: a) existing RIDs are copied from the RID array to a larger self-describing RID array that has a counter that counts how many RIDs are stored in the new RID array, b) the new RID is stored in the new RID array, and c) the counter bit field in the build key entry remains frozen as all ones as shown such that incrementation for subsequent duplicates occur with the counter in the new RID array instead of the counter bit field in the build key entry.

To avoid further counter overflow, the counter in the new RID array is wider than the counter bit field and wide enough to never overflow. If the new RID array itself (not its counter) overflows, then a larger self-describing RID array may replace the current self-describing RID array, which entails copying RIDs into the larger RID array and reassigning the truncated pointer in the build key entry. In an embodiment, for a same location in a same bucket, each new self-describing RID array is exponentially larger than the RID array it replaces.

In one such embodiment, the exponential increase entails doubling in size. As discussed later herein, exponential sizing is well suited for data skew. In an embodiment, a new RID array of fixed or larger size does not replace the old RID array but instead is appended or prepended onto a linked list of RID arrays that form a segmented array for a same location of a same bucket.

Data skew is an example of different join keys occurring with different frequencies in field 120 and/or 140. With the RID and pointer encodings in the build key entries of build key values A-C in hash table 171, the information density of the build key entries is inversely proportional to the frequency. That is, build key value B is least frequent, but the build key entry of build key value B is densest because it directly encodes a RID instead of encoding a pointer for indirection.

Build key value A is more frequent, and the build key entry of build key value A is less dense because it counts RIDs but does not encode a RID. Build key value C is most frequent, but the build key entry of build key value C is least dense because it neither encodes nor counts RIDs.

There is a counter-intuitive reduction in memory consumption with such inversely proportional information density because, even though build key value C has the most occurrences (e.g. ten), those ten occurrences share a same clustered build key entry. Here, clustered entails duplicate build key values. Whereas a separate build key entry is needed for each singleton build key value such as build key value B. Here, singleton means no duplicates. Thus, there may be more singleton build key values than clustered build key values, even if there are fewer singleton build key values than duplicate occurrences of build key value C. Thus counter-intuitively, spatial savings of denser singleton build key entries may outweigh the spatial cost of less dense clustered build key entries.

Likewise, information density of the build key entry of build key value C is less than that of build key value A, as explained above, even though both build key values A and C have clustered build key entries. However, the lower density for build key value C is a spatial cost that is amortized across more duplicates than for build key value A because build key value A is less frequent. In those ways, the build key entries of hash table 171 are spatially optimized.

2.0 Example Probe Process

Figure 3:
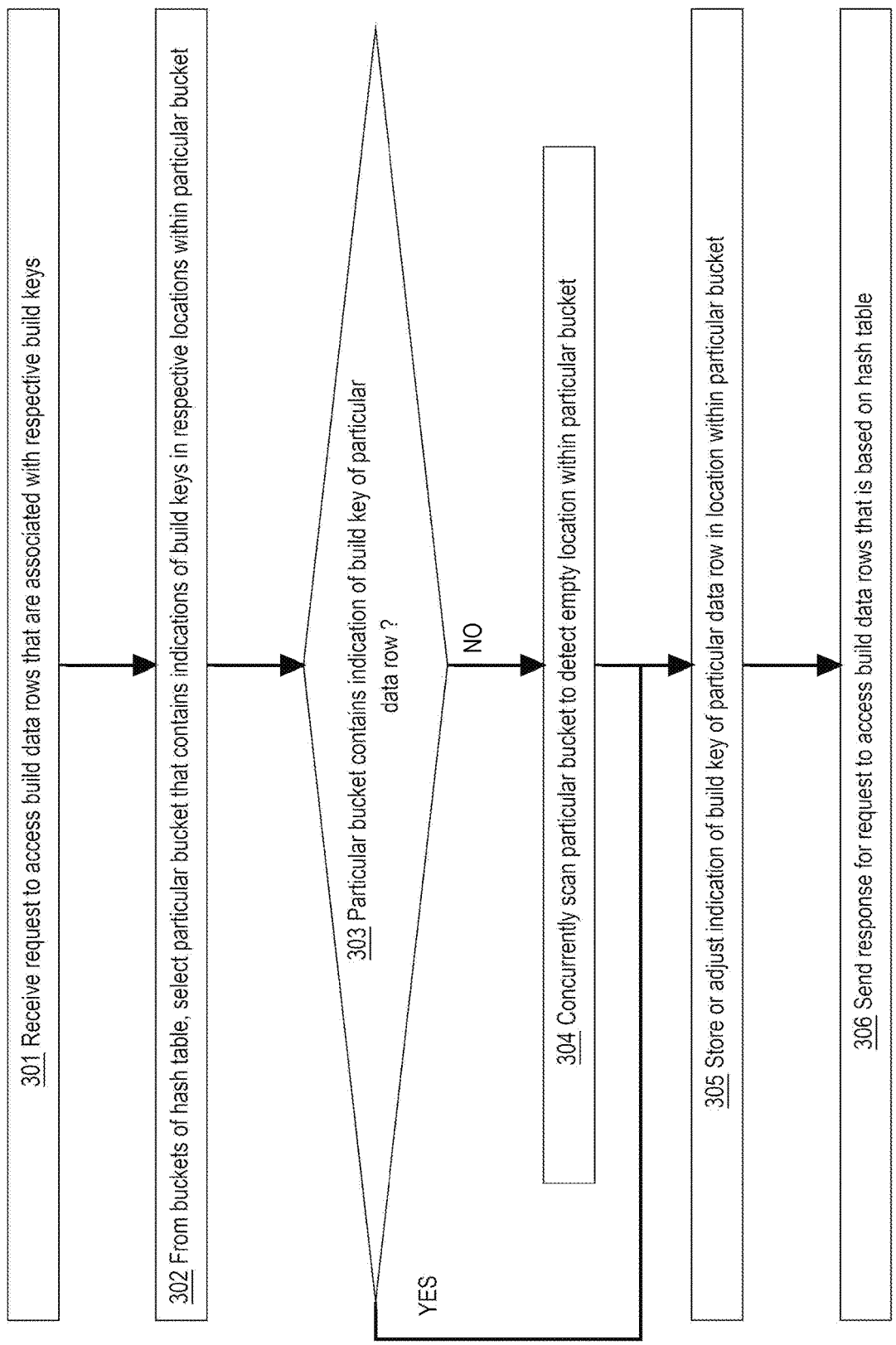
FIG. 3 is a flow diagram that depicts an example hash table building process.

As explained earlier herein, a hash join may entail a build phase that populates hash table 170 followed by a probe phase that uses hash table 170 for match making. FIG. 2 depicts an example probe phase. FIG. 3 depicts an example build phase.

For example and without fusing operators from both phases as explained later herein, computer 100 may perform the build process of FIG. 3 and then subsequently perform the probe process of FIG. 2 for same hash table 170. However, FIG. 2 is presented herein first because some embodiments of the probe phase may be somewhat less complex than the build phase. FIGS. 2-3 are discussed with reference to FIG. 1.

FIG. 2 is a flow diagram that depicts an example probing process that joins data rows 110 and 130. In an embodiment, novel acceleration of the probe phase is provided by concurrent probing of multiple entries in the hash table 170 such as with single instruction multiple data (SIMD) as described later herein.

Step 202 receives request 150 that specifies or implies a relational equijoin of data rows 110 and 130 based on fields 120 and 140. In an embodiment in step 202, a query planner, optimizer, and/or compiler translates request 150 into an interpretable or executable form such as a database operator tree. In an embodiment, the build phase and probe phase of the join are implemented by respective operators in the tree.

In an embodiment, a table scan operator is fused (i.e. combined) with a build operator for the build phase. In an embodiment, a probe operator of the probe phase is fused with a payload operator that supplements join results with additional fields such as projected other fields of data rows 110 and/or 130. For example, elements of hash table 170 may contain some or all other fields of build data rows 110.

A build phase such as the process of FIG. 3 may occur between steps 202 and 204. Step 204 assumes that hash table 170 is already populated such as by the build phase. The build phase may be followed by a probe phase such as follows.

In one example, build data rows 110 are used in the build phase, and probe data rows 130 are used in the probe phase. Depending on the embodiment and scenario, data rows 110 and 130 may differ in semantics, format, and/or content but nonetheless be somewhat interchangeable respective data sets for joining. In an embodiment, computer 100 may decide which of those two data sets is used for the build phase, and the other data set will be used for the probe phase. For example, probe data rows 130 may instead be used for the build phase, and build data rows 110 may be used for the probe phase.

The probe phase includes steps 204 and 206 that may be repeated for the respective probe key value of each row of probe data rows 130. Probe data row P1 has, as its probe key value, value B of field 140. From buckets Y-Z of hash table 170, step 204 selects, based on some or all bits of value B or some or all bits of a hash code for value B, bucket Z that contains entries of zero or more same or different build key values.

Step 206 matches respective probe key values (i.e. field 140) of probe data rows 130 to respective elements of hash table 170. Probe key values are iteratively used in step 206 that matches a probe key value to an element of bucket Y or Z by concurrently comparing part or all of the probe key value or its hash code to all of the whole or partial build key values or hash codes in the bucket and without linear scanning. Concurrent comparing is innovative and discussed later herein.

Step 206 produces join results. Step 208 sends response 180 that answers request 150. Depending on the example: a) the join results may be response 180, b) response 180 may contain the join results and additional data, c) response 180 may contain some vertical and/or horizontal slice of the join results, or c) response 180 is otherwise based on, but does not contain, the join results.

3.0 Example Build Process

FIG. 3 is a flow diagram that depicts an example building process that populates hash table 170 based on build data rows 110. In an embodiment, novel acceleration of the build phase is provided by concurrent accessing of multiple entries in the hash table 170 such as with single instruction multiple data (SIMD) as described later herein. In an embodiment, the build phase is more complex than the probe phase that follows it.

Step 301 receives request 150 that specifies or implies a relational equijoin of data rows 110 and 130 based on fields 120 and 140. Although shown as separate steps in separate processes, step 301 and step 202 of FIG. 2 may be a same step that receives request 150. Except as explained elsewhere herein, steps 202 and 301 are combined into a single step.

The build phase includes steps 302-305 that may be repeated for the respective build key value of each row of build data rows 110. Build data row B1 has, as its probe key value, value A of field 120. From buckets Y-Z of hash table 170, step 302 selects, based on some or all bits of value A or some or all bits of a hash code for value A, bucket Y that contains entries of zero or more same or different build key values.

The build phase and the probe phase both use a join key value to look up a bucket. In an embodiment, step 302 and step 204 of FIG. 2 are separate steps in separate phases that share a same step implementation. For example, steps 204 and 302 may be separate invocations of a same subroutine even though step 302 uses build key values of build data rows 110 and step 204 uses probe key values of probe data rows 130. That is, a build key and a probe key are both join keys that in various examples may be partially processed in a same way such as for an equijoin.

What subset of steps 303-305 occur for any of build data rows 110 may depend on: a) whether or not duplicates are possible, b) whether or not value A is a duplicate, c) whether or not duplicates are relevant to request 150, and/or d) whether duplicates should be integrated or kept separate. The following Table 1 shows which steps follow step 302 based on the following build scenarios 311-315 and conditions for each row of build data rows 110. Different rows in same build data rows 110 may entail same or different respective build scenarios.

Thus, different respective subsets of steps 303-305 may occur for different build data rows. For example, a first occurrence of value A is not a duplicate, but a second occurrence of same value A is a duplicate. Thus, different occurrences of same value A may or may not cause different build scenarios. Likewise, a same step may or may not behave somewhat differently based on which build scenario does value A cause.

| Build scenario | Duplicates possible ? | Is duplicate ? | Duplicate handling | Subset of steps |
|---|---|---|---|---|
| 311 | No | | | 304-305 |
| 312 | Yes | No | | 303-305 |
| 313 | Yes | Yes | Ignore by skipping | 303 |
| 314 | Yes | Yes | Integrate | 303, 305 |
| 315 | Yes | Yes | Keep separate | 303-305 |

In build scenario 311, duplicate build key values are impossible such that each build data row has a distinct respective build key value such as when: a) a relational schema indicates that field 120 has distinct values, b) build data rows 110 is an intermediate result based on row aggregation such as with grouping such that field 120 necessarily has distinct values, or c) a scan of build data rows 110 or an index scan or other inspection empirically indicates that field 120 incidentally has distinct values. For example, a dynamically generated encoding dictionary of field 120 for a relational table or an in memory compression unit (IMCU) that contains as many dictionary codes as there are rows in build data rows 110 may or may not indicate that field 120 incidentally has distinct values. IMCUs are discussed later herein.

Step 303 detects whether or not hash table 170 already contains the current build key value. If hash table 170 already contains the build key value, then step 305 occurs. Otherwise, the build key value is not a duplicate, and step 304 occurs as follows. Step 303 is further discussed later herein.

Step 304 concurrently finds an empty location among all the locations 0-1 within bucket Y. In an embodiment, an empty location is represented as storing an entry of a null join key value. In that case, step 304 and step 206 of FIG. 2 are separate steps in separate phases that share a same step implementation.

For example, steps 206 and 304 may be separate invocations of a same subroutine because null key values and probe key values are both join key values that in various examples may be partially processed in a same way. Regardless of whether or not a null key value represents an empty location, steps 206 and 304 may have similar parallelism. When bucket Y contains multiple empty locations, one empty location is selected according to criteria that depend on the embodiment.

Step 305 stores or adjusts an entry of value A that is the build key value of build data row B1 in a location within bucket Y. The behavior of step 305 and the location within bucket Y depend on the build scenario. For build scenarios 311-312 and 315: a) the location is an empty location as found by step 304, and b) a new entry of value A is stored into that empty location.

In build scenario 312, build data row B1 has a first or only occurrence of value A even though duplicates are possible. In that case, step 303 detects that value A is not a duplicate. Regardless of the build scenario and regardless of whether value A is or is not a duplicate, step 303 occurs as follows.

As explained above, step 303 detects whether or not bucket Y contains an entry of value A that is the build key value of build data row B1. In an embodiment, step 303 and step 206 of FIG. 2 are separate steps in separate phases that share a same step implementation. For example, steps 206 and 303 may be separate invocations of a same subroutine because a build key and a probe key are both join keys that in various examples may be partially processed in a same way such as for an equijoin.

Thus, steps 206 and 303 may have similar parallelism. Step 303 can simultaneously compare value A to multiple entries of same or different values in same bucket Y without linear scanning.

In build scenarios 313-315, step 303 detects that value A is a duplicate. In build scenario 313, duplicates are irrelevant to request 150, and build data row B3 should be ignored by skipping steps 304-305 for build data row B3. For example, request 150 may be an online analytical processing (OLAP) query that uses an equijoin of a fact table and a dimension table for filtration, but response 180 excludes the fact table and only projects the dimension table.

For example: a) purchase orders may be facts, b) the dimension table may catalog products, and c) response 180 indicates only products that have no purchase orders. That assumes that build data rows 110 are facts (i.e. purchase orders). Embodiments are free to use either the fact table or the dimension table for the build phase, and the other table is used for the probe phase. In an embodiment, whichever table or input row set has fewer rows is used as build data rows 110. Other criteria for designating which input row set is used as a build data rows 110 include: which input row set consumes less volatile memory, which input row set has more distinct key values, and which input row set has less data skew. In an embodiment, the dimension table is always used as build data rows 110.

In build scenario 314, duplicates should be integrated, which entails adjusting an existing entry of value A in bucket Y. For example, the element column of hash table 170 may instead contain a count of occurrences of value A that should be incremented by one each time value A reoccurs. Build scenario 314 skips step 304 that would have found an empty location in bucket Y, because build scenario 314 reuses an already existing entry of value A that was found by step 303.

As shown in FIG. 1, build scenario 315 inserts another entry of duplicate value A into same bucket Y when value A reoccurs. For example, response 180 may report different purchase orders for a same product. In any case, build scenario 315 entails steps 303-305 as described above.

After all build data rows B1-3 are processed according to the respective build scenarios, population of hash table 170 is complete, and step 306 occurs. In most cases, the probing process of FIG. 2 may occur more or less immediately before step 306. In that case, step 306 and step 208 of FIG. 2 are a same occurrence of a same step that sends same response 180 that answers same request 150. Thus, steps 208 and 306 may be combined to send only one response 180.

In an embodiment, hash table 170 may be reused in various ways. For example, a subsequent join for a same or different request may skip the build phase (FIG. 3), and the probe phase (FIG. 2) reuses hash table 170 for same or different probe data rows. For example, three relational tables A-C may have similar join columns a-c that are used in a union of two equijoins such as A.a=B.b OR A.a=C.c. In that case, table A may be used in a build phase that populates hash table 170, and the remaining two tables B-C may be used in respective separate probe phases that both use same hash table 170 for separate respective joins.

4.0 Example Join Key Configurations

As explained earlier herein, fields 120 and 140 are used as join keys, which may be a build key or a probe key. Depending on the embodiment and use case, a join key may be formatted and/or used in a particular way, known herein as a join key configuration. In addition to example join keys already presented herein, the following Table 2 enumerates additional example join key configurations 631-634, some or all of which may be operated by computer 100 in various embodiments.

| Join Key Configuration | Meaning |
| --- | --- |
| 631 | Grouping key |
| 632 | Compound candidate key |
| 633 | Set of field(s) that is not a candidate key |
| 634 | Encoding dictionary code |

In join key configuration 631, field 120 or 140 may be used as both a grouping key and a join key. For example, request 150 may be SQL that contains a GROUP BY clause that designates field 120 even when field 120 is not a candidate key such as a primary key of a relational table. A grouping key usually contains duplicates.

In join key configuration 632, multiple fields of a same relational table or set of data rows such as 110 or 130 may be used together as both a compound candidate key and a compound join key. When a join key is a candidate key, duplicates are absent because a candidate key should uniquely identify individual rows. In various examples, only the build key is a candidate key, or only the probe key is a candidate key, or neither or both are candidate keys. In an example, an equijoin key: a) occurs both as field 120 and as field 140, b) is a candidate key of a dimension table but not a candidate key of a fact table that is being joined to the dimension table, and c) has duplicates in the fact table but not the dimension table.

In join key configuration 633, a compound join key is not a candidate key. In join key configuration 634, a join key is dictionary encoded. Each distinct unencoded value of the join key may correspond to a respective distinct dictionary code. In an embodiment, unencoded values are sparse, and dictionary codes are dense such as continuous integers.

5.0 Example Entry Configurations

Depending on the embodiment and use case, a build key entry may be formatted and/or used in a particular way, known herein as an entry configuration. As explained earlier herein, a bucket can store multiple entries of same or different build key values. Also as explained earlier herein, various embodiments of hash table 170 may have different respective build key entry formats that are or are not designed for concerns such as hash codes, duplicates, and pointers.

The following Table 3 enumerates example entry configurations 611-617, some or all of which may be operated by computer 100 in various embodiments. Additional entry configurations are presented later herein.

| Entry Configuration | Meaning |
| --- | --- |
| 611 | The join key value of a build data row |
| 612 | A hash code of the join key value |
| 613 | A count of duplicate occurrences of a same build key value |
| 614 | Other field(s) of the build data row |
| 615 | For duplicates integrated for a same build key value, an extreme value of another field of the duplicative rows |
| 616 | For duplicates integrated for a same build key value, a central tendency of another field of the duplicative rows |
| 617 | A pointer to entry data |

Entry configuration 611 stores some or all of the bits of the build key value directly within the key entry in hash table 170. In this case, the key entries include at least the build key column that is shown in hash table 170.

Entry configuration 612 stores some or all of the bits of a hash code of the build key value directly within the key entry in hash table 170. In some cases, the hash code may contain fewer bytes than the build key value such as with a text build key value and an integer hash code. In an embodiment, space is saved when the key entry contains the hash code instead of the build key value.

In most cases, relying on a hash code in a key entry is inexact, which may cause collisions when different join key values have a same hash code, which may also cause false hits (i.e. false positives). Collisions may require additional logic for disambiguation. In an embodiment, disambiguation is delegated to application specific logic that may compare other fields of data rows 110 or 130 to establish which build key value does a key entry actually represent. In an embodiment, the key entry itself contains data such as the element column of hash table 170 or a pointer to a build data row or other data that can be used in a generic way for automatic disambiguation by the DBMS itself.

Entry configuration 613 maintains a count of duplicate occurrences of a same build key value directly in the key entry such as for SQL that uses COUNT with GROUP BY. Entry configuration 614 stores other field(s) of build data rows 110 directly in the key entry such as a primary key or fields that are materialized such as for projection such as for a response 180 or an intermediate result. If build data rows 110 is itself an intermediate result of an earlier join when request 150 has multiple joins such as a multiway join such as A.a=B.b=C.c, then the key entry may contain field(s) from multiple relational tables.

Entry configurations 615-616 support duplicate occurrences of a same build key value by integration into a same key entry such as for SQL GROUP BY with SQL aggregation functions such as SUM. Entry configuration 615 maintains an extreme value of another field or calculation for each build data row that has that same build key value, such as MAX. Entry configuration 616 maintains a central tendency value of another field or calculation for each build data row that has that same build key value, such as STDDEV or AVG.

Entry configuration 617 stores a pointer or offset to a build data row or other data that is associated with the build data row. Various examples include: a) a pointer to a data row in a row cache or database block in a buffer cache, b) a durable row identifier such as a ROWID, or c) a volatile offset into a vector of row identifiers such as a primary key or into a set of IMCUs of a same relational table or row set. In embodiments, integer offsets may be narrower than pointers, or a pointer may be multibyte aligned such that least significant bits are always: zero, implied, not stored, and/or repurposed as bit field(s).

6.0 Example Bucket Configurations

Figure 4:
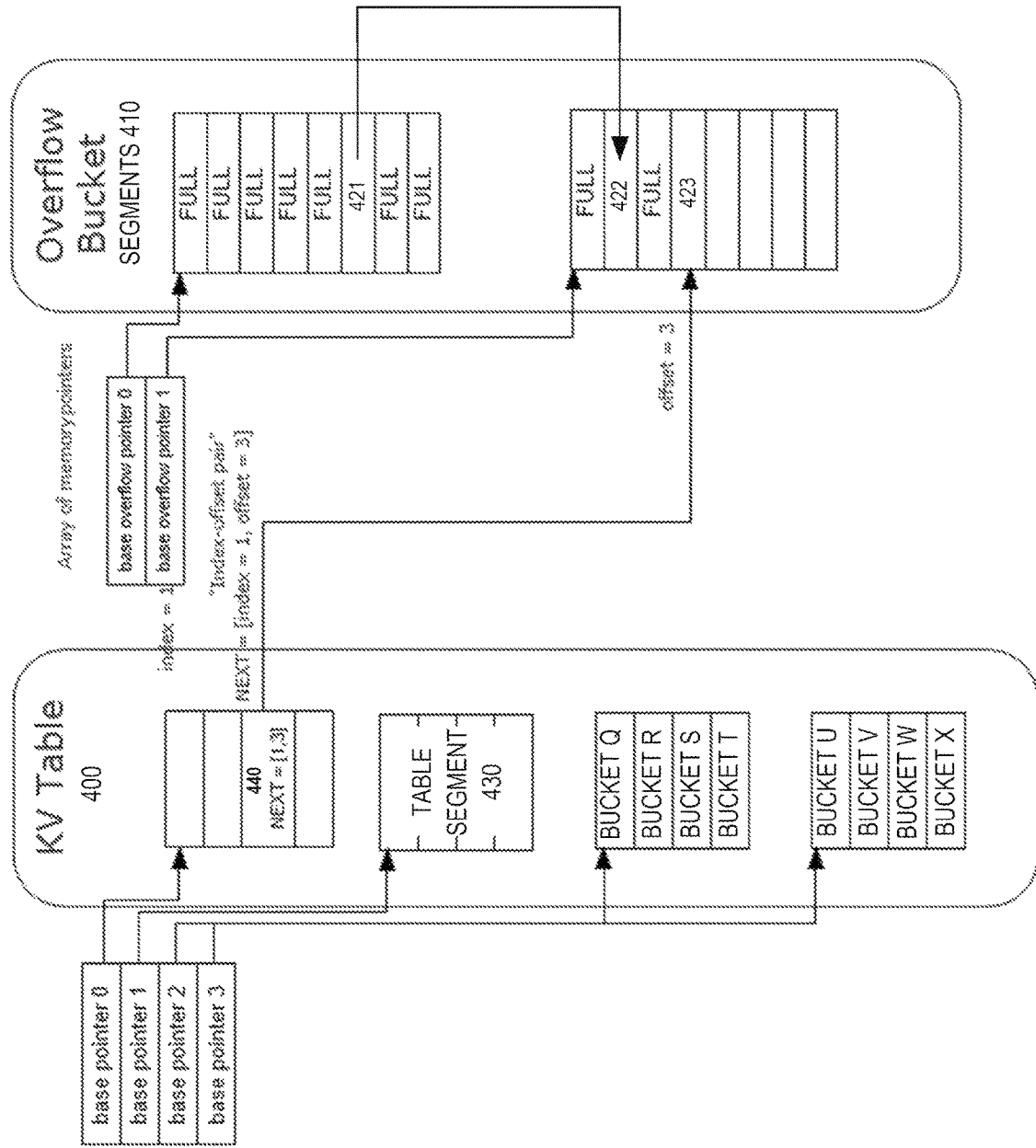
FIG. 4 is a block diagram that depicts example segmentation and indirection schemes for a hash table or another kind of data map.

FIG. 4 is a block diagram that depicts example segmentation and indirection schemes for a hash table or, as presented later herein, another kind of data map. As shown, key value (KV) table 400 may be a hash table or other kind of data map. For example, KV table 400 may be an implementation of hash table 170 of FIG. 1.

The following Table 4 enumerates example bucket configurations 621-623, some or all of which may be incorporated into KV table 400 in various embodiments. Additional bucket configurations are presented later herein.

| Bucket Configuration | Meaning |
|---|---|
| 621 | Bucket is a segmented array |
| 622 | Bucket or segment is not larger than hardware cache line |
| 623 | Bucket or segment has same memory address alignment as hardware cache line |

In bucket configuration 621, each bucket may be a segmented array to accommodate overflow. A bucket segment as discussed later herein is not the same as a table segment, which is as follows.

In an embodiment, KV table 400 is an array of buckets, such as Q-X, such that some or all bits of a hash code or build key value may be used as an index into the array to identify a bucket. In the shown embodiment, KV table 400 is a segmented array of expandable buckets Q-X such that each table segment, such as 430, contains an array of buckets. Table segment 430 by itself is a contiguous region of memory, but the multiple table segments in KV table 400 may or may not be dis-contiguous to each other. Depending on the embodiment or scenario, KV table 400 may: always contain a same fixed amount of table segments and base pointers, or grow additional table segments and base pointers as needed during the build phase.

As shown, KV table 400 has four table segments, including 430, that each contain four buckets such that KV table 400 contains a total of 4×4=sixteen buckets. For example, a table segment contains bucket Q-T that are contiguous to each other, and another table segment contains buckets U-X. Each of shown base pointers 0-3 points to a respective table segment in KV table 400 as shown. For example, base pointer 1 points to table segment 430 In that way, KV table 400 may be a segmented hash table, which is not the same as a hash table with segmented buckets, although a hash table may be both segmented and have segmented buckets as explained later herein.

A segmented hash table is decomposed into disjoint subsets of buckets such that, in an embodiment and so long as the following conditions occur, each table segment may itself be a smaller hash table with a respective subset of KV table 400's buckets. For example as shown, KV table 400 has four segments, each of which, in an embodiment, may be built and probed with a distinct subrange of key values that are guaranteed to map to the hash table segment's respective subset of buckets. That may entail horizontally partitioning build and/or probe data rows by join key value. In an embodiment, there is symmetric multiprocessing (SMP) such as with one or more table segments per processor core for task parallelism.

In an embodiment not shown, a bucket has a fixed capacity to contain multiple build key entries. In the shown embodiment, a bucket has more or less unlimited capacity that may be allocated one bucket segment at a time as needed. Each bucket segment has a same capacity to store multiple entries of a same or different build key value.

Depending on the embodiment, the array of buckets Q-X of KV table 400 stores: a) directly each bucket of a same fixed capacity, b) in the shown embodiment, directly a respective first segment of a same fixed capacity for each bucket of unlimited capacity, or c) indirectly a pointer or offset to a respective first segment for each bucket of unlimited capacity. For example with (b) as shown, a table segment contains bucket segments, such as bucket segment 440, that are respective first segments for each bucket in that table segment. For example, bucket segments 440 and 423 may be daisy chained in that ordering, shown with an arrow labeled NEXT, to provide a linked list of bucket segments to expand the storage capacity of a bucket.

In the shown embodiment, each bucket segment contains a pointer or offset to a next segment of a same bucket such that each bucket is a segmented array based on a linked list of bucket segments. In an embodiment, bucket segments for all buckets of a same or different hash table are pre-allocated in a same array, shown as overflow bucket segments 410, whose elements include individual overflow bucket segments 421-423 such that a link in a linked list of a bucket may be an offset into the array of overflow bucket segments 410. For example, the offset may be narrower than an address pointer.

For example, overflow bucket segments 410 may operate as a pool from which a spare bucket segment may be taken and later returned when KV table 400 is discarded. In an embodiment, a bitmap indicates which spare bucket segments 421-423 currently participate in a linked list of any bucket. In an unshown embodiment without a pool, bucket segments of a same bucket have exponentially increasing capacity such as powers of two to save space when a bucket is small and save repeated segment allocation time when a bucket is large.

In bucket configuration 622, each bucket or bucket segment has a same fixed size that is not larger than a hardware cache line such as for an L1, L2, or L3 cache of a central processing unit (CPU) or processor core such that a bucket or bucket segment can always fit in a hardware cache line. Thus, buckets that are heavily accessed are cached to exploit temporal locality such as due to data skew of join key values during the build phase and/or probe phase.

In bucket configuration 623, each bucket or bucket segment has a same multibyte memory address alignment as a hardware cache line. For example when a hardware cache line is 64 bytes wide, then a bucket segment is aligned to a 64 byte boundary such that the six least significant bits of the bucket segment address are always: zero, implied, not stored, and/or repurposed as bit field(s).

7.0 Example Kinds of Prefetch Data

Buckets and hash tables are data structures that aggregate data as explained earlier herein. These data structures may provide a regular organization of data such as when data items have a uniform fixed size and/or address alignment, which facilitates data parallelism for acceleration such as with vector processing. Especially with data parallelism such as SIMD operations, memory latency may reduce throughput, which may be alleviated by cache prefetching of data from main memory into a hardware cache.

An embodiment may use software prefetching such as with a prefetch instruction of an instruction set architecture (ISA). The term "stride" refers to the amount of bytes or data items to be concurrently prefetched. A DBMS may or may not calculate stride based on SIMD register width and/or time predictions such as clock cycles such as based on static or just in time accounting for a machine instruction sequence and/or memory wait states. In an embodiment, demarcation of strides is calculated by a just in time compiler such as a query compiler, a bytecode compiler, and/or an optimizing profiler. In an embodiment, stride demarcation is hard coded such as by hand in textual source code.

The following Table 5 enumerates example kinds of prefetch data 641-644, some or all of which may be used by computer 100 in various embodiments. In an embodiment, each of prefetch data 641-644 is a stride of multiple data items of a same kind such as a horizontal and/or vertical slice at a memory address or offset within an array. In an embodiment, multiple items in same or different strides are contiguous in main memory and directly copied into a hardware cache by prefetching.

| Prefetch Data | Meaning |
| --- | --- |
| 641 | Multiple buckets or bucket segments |
| 642 | Multiple join key values |
| 643 | Precalculated hash codes of multiple join key values |
| 644 | ROWIDs, primary keys, or other fields of multiple data rows |

Prefetch data 641 is multiple buckets or respective segments of multiple buckets, either of which has a same fixed size. Prefetch data 642 is multiple join key values of data rows 110 or 130. Regardless of how hash codes of multiple join key values are calculated, such as concurrently or not, those hash codes may subsequently be contiguously stored in memory that provides prefetch data 643.

Other prefetch data 644 may be associated with respective data rows 110 or 130 such as ROWIDs, primary keys, other fields, or whole data rows themselves. Multiple strides in sequence may or may not be needed to eventually prefetch data items for all data rows 110 or 130, and timing may be application specific such that a previous stride need not be immediately followed by a next stride such as when prefetching a stride is faster than processing a stride. In an embodiment, stride prefetching and stride processing occur in a same computational thread and/or machine instruction sequence.

8.0 Example Parallelism of a Hash Join Operation

Figure 5:
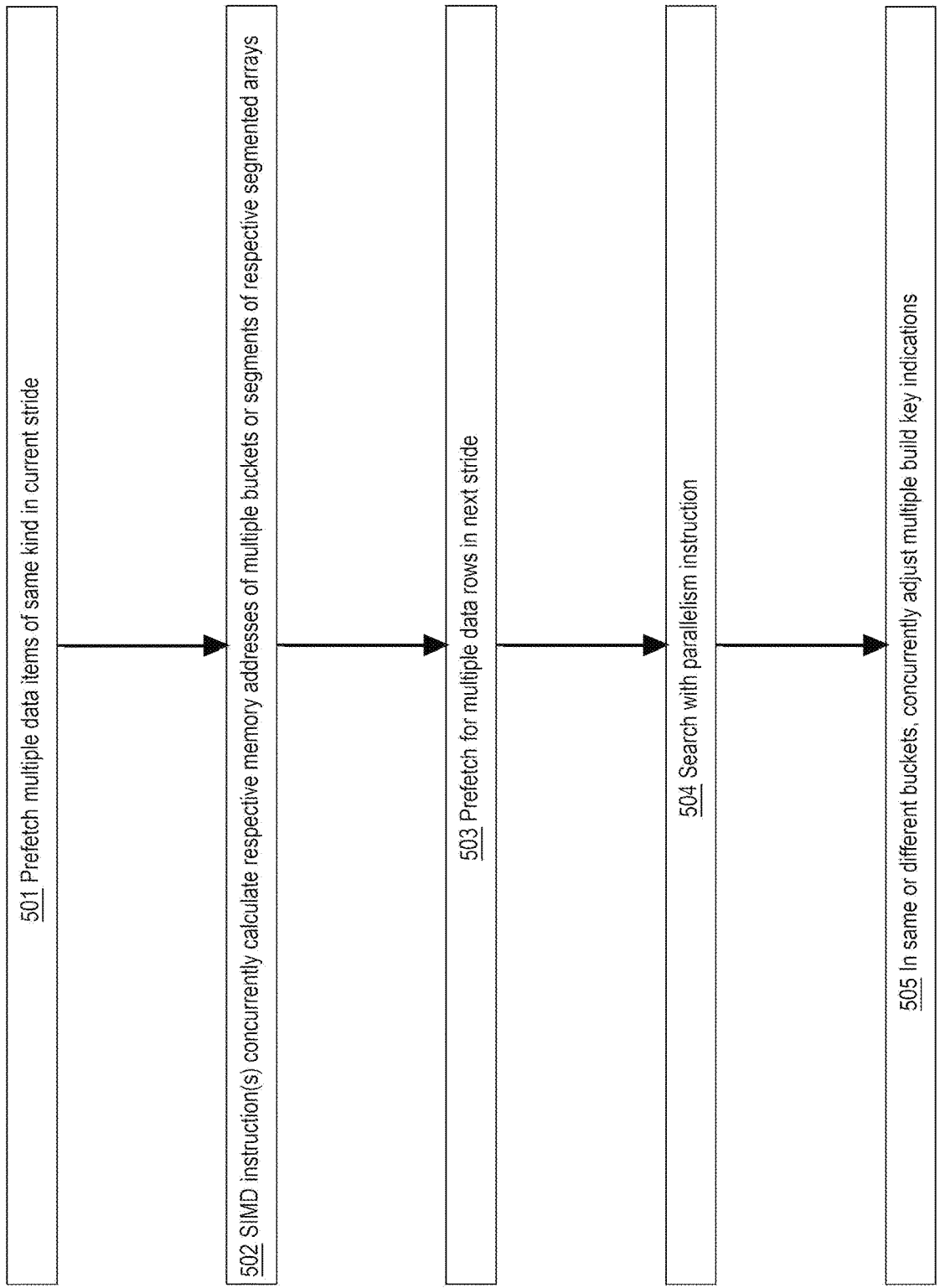
FIG. 5 is a flow diagram that depicts an example parallel process for accelerating probing and/or building.

As explained earlier herein, the build phase may search within a bucket to find: a) an existing entry for a duplicate build key value, or b) an empty location. Thus, the build phase and probe phase may entail somewhat similar find activities. FIG. 5 is a flow diagram that depicts an example parallel process for accelerating probing and/or building. FIG. 5 is discussed with reference to FIG. 1.

Steps 501 and 503 demonstrate prefetching for pipelined parallelism. As presented above, prefetching bulk loads data to keep a hardware cache warm despite eventually iterating over all data rows 110 or 130 in a single pass that would otherwise greatly increase observable latency of main memory even with the hardware cache. The following example prefetching provides pipeline parallelism for increased throughput.

Each of steps 501 and 503 respectively entails at least two strides of same or different respective kinds of data in same or different respective ways. Step 501 prefetches a current stride of a kind of data items while simultaneously processing a previous stride of the same kind of data items. Strides of multiple respective kinds of data items may also be simultaneously prefetched as discussed below.

Step 502 concurrently calculates respective memory addresses of multiple buckets or bucket segments such as by SIMD, superscalar, or superpipeling that are discussed below. Step 502 may concurrently translate multiple hash codes or join key values to memory addresses of respective same or different buckets. Step 502 calculates duplicate addresses when multiple same or different hash codes or join key values belong in a same bucket or segment.

Step 503 may be implemented as steps 503A-B (not shown) that concurrently occur. A stride of a kind of data items and a stride of another kind of data items may be simultaneously prefetched. At a same time, step 503A prefetches respective buckets or segments for some multiple data rows while step 503B prefetches hash codes or join key values of same or other multiple data rows of a same row set. For example, step 503A may use bucket or segment addresses that were calculated by step 502. Multiple strides may be more or less simultaneously prefetched by executing multiple respective prefetch instructions in rapid succession such as when prefetching a stride is slower than placing multiple instructions into a CPU instruction execution pipeline.

Step 504 executes one of various CPU parallelism instructions to perform a respective one of steps 504A-C (not shown). Steps 504A-C are mutually exclusive ways of concurrent scanning that are based on the embodiment. In other words, an embodiment performs a respective one of steps 504A-C. As used herein, concurrent scanning is not linear nor sequential scanning.

Step 504A executes an individual single instruction multiple data (SIMD) instruction of an instruction set architecture (ISA), which concurrently scans multiple key entries in a same bucket or bucket segment to find: a) an entry of a given join key value during the build phase or probe phase, or b) an empty location in the bucket or segment during the build phase. In an embodiment, the same SIMD instruction is repeatedly executed for one segment after another in the linked list of segments of the same bucket until the given key entry or empty location is found or there are no more segments in the linked list.

A superscalar processor concurrently executes multiple instructions. In a scalar embodiment, those same multiple instructions are instead sequentially executed by a scalar processor. Step 504B concurrently executes, by a superscalar processor, multiple instructions that each compares a same or different key entry to a respective entry in a respective location of a same bucket or segment. For example, if a bucket contains two locations that each may be inspected by a respective one of two similar instructions, then the superscalar processor concurrently executes both instructions to concurrently inspect both locations for a given key entry or an empty location.

A superpipelined processor: a) divides a CPU clock cycle into subcycles, b) concurrently executes multiple pipeline stages for a same instruction during a same CPU clock cycle, and c) initiates another instruction at each subcycle such that execution of many instructions temporally partially overlap. In another embodiment, those same many instructions are instead respectively initiated only at a respective CPU clock cycle on an ordinary CPU. Step 504C concurrently executes, by a superpipelined processor, multiple instructions that each compares a same or different key entry to a respective entry in a respective location of a same bucket or segment. For example, if a bucket contains two locations that each may be inspected by a respective one of two similar instructions, then the superpipelined processor concurrently executes both instructions to concurrently inspect both locations for a given key entry or an empty location.

In an embodiment, step 502 as discussed above calculates the address of the first segment when a bucket is a segmented array. In an embodiment, step 504A uses various SIMD instructions in sequence to concurrently traverse multiple linked lists of segments of respective buckets.

In a same bucket or different buckets, step 505 concurrently adjusts multiple entries of same or different build key values when duplicates occur. For example, an individual SIMD instruction may concurrently update data that is directly or indirectly contained in multiple key entries.

9.0 First Exemplary Embodiment

The following exemplary embodiment with pseudocode demonstrates implementation choices that may be used with some or all of the embodiments presented earlier herein. Features of this exemplary embodiment are not requirements of the embodiments presented earlier herein.

This exemplary embodiment demonstrates architecture neutrality of: a) a CPU with SIMD processing lanes and/or SIMD wide registers, b) main memory, c) bulk storage data formats such as row major, column major, relational schema, and/or database blocks, and d) multithreading such as with a multicore CPU. This exemplary embodiment may or may not use an Intel CPU such as a Pentium 4 or Xeon, both of which have exemplary SIMD instruction set architectures (ISA) that provide data parallelism feature sets such as multimedia extensions (MMX), streaming SIMD extensions (SSE), and advanced vector extensions (AVX).

In multithreaded scenarios, thread safety may be assured by: a) hardware synchronization such as atomic instructions or cache coherency instructions of an ISA such as a memory barrier or fence, b) software synchronization such as mutual exclusion (mutex), semaphore, or critical section, or c) horizontal data partitioning by join key value or hash code such that multiple computational threads do not share buckets such as with a partitioned hash table. For example, SQL aggregation functions may rely on atomic instructions such as fetch-and-add, and a daisy chain of segments of a same bucket may grow without contention with a compare-and-swap atomic instruction.

9.1 In Memory Compression Unit

Those are examples of coarse-grained thread parallelism such as with a multicore or hyperthreaded CPU that may complement and further accelerate the fine-grained data parallelism of SIMD or other vector hardware. For example, each computational thread may asynchronously apply a same logic to a separate respective subset of data rows 110 or 130 that is available in a separate respective in memory compression unit (IMCU). An IMCU contains contiguously stored values from one or more columns of a database table or intermediate result set. Structure and operation of an IMCU is as follows.

For example, in a dual-format database system, one of the formats in which the data is made available for query processing is based on the on-disk format, while another of the formats in which the data is made available for query processing is independent of the on-disk format.

The format that corresponds to the on-disk format is referred to herein as the "persistent format" or "PF". Data that is in the persistent format is referred to herein as PF data. An in-memory format that is independent of the on-disk format is referred to as a "mirror format" or "MF". Data that is in the mirror format is referred to herein as MF data. For example, in one embodiment, the persistent format is row-major disk blocks, and the mirror format is a column-major format. Such a dual-format database system is described in U.S. patent application Ser. No. 14/337,179, entitled Mirroring, In Memory, Data From Disk To Improve Query Performance (hereinafter the "Mirroring Application"), the contents of which are incorporated herein by this reference.

The MF data may be organized, within volatile memory, into "in-memory compression units" (IMCUs) that contain vector(s) that contain contiguous values from one or more columns of a same set or subset of rows. Thus, an IMCU may be at least a vertical slice of a database table and, when only a subset of rows are involved with the IMCU, the IMCU is also a horizontal slice of the database table. Because of the columnar format and contiguous storage of column values, an IMCU may facilitate vector processing for data parallelism such as follows. Furthermore because when same column(s) are horizontally sliced (i.e. horizontally partitioned) into multiple IMCUs, those IMCU may be treated as segments of columns such that each IMCU may be concurrently processed by a respective processor core as discussed earlier herein.

9.2 Multiple Synergistic Forms of Parallelism

With or without storing data rows 110 or 130 in IMCUs, hash table buckets are sized to constrain unused space to a specified fraction of the total space consumed by a hash table, and to constrain the maximum number of bucket segments chained together for each hash key value. In this design, the hash buckets are sized to efficiently interact with the memory and vector architecture. This means that their size is fixed at the unit of memory retrieval ("cache line size"), and the size of the hash table is set to make most probes succeed in one bucket segment retrieval.

There are a number of advantages that result from this organization. First, the lookup operations can be pipelined effectively such as by prefetching because the mapping from lookup key value to bucket is usually correctly predicted and consistently executed. Second, because each lookup key value is independent, multiple of these mappings can be conducted in parallel when the CPU has either superscalar or explicit vectorization, or both.

Another significant implementation detail is that, for each use case of hash tables, such as depending on join key type, the bucket's internal layout is specialized to both maximize the number of key values it stores, and to enable bucket searches using vector instructions. This results in an execution model where execution alternates between parallel-across-buckets and parallel-within-buckets operations, both with SIMD in same or different computational threads, which maximizes the utilization of the memory system and CPU resources.

There are additional elements that contribute to the efficiency of the design. Following chains is not an inherently parallel operation, but can benefit from superscalar execution and memory prefetching. Execution switches to a serial mode in this situation that is superscalable (e.g. if multiple chains are discovered in the parallel phase, these are implicitly parallelized).

Because input key values are unpredictable, the buckets read are as well and, for a large hash table residing mostly in main memory, the latency of reading random data is high. In order to hide that latency, the operations that comprise a lookup are explicitly pipelined.

Figure 6:
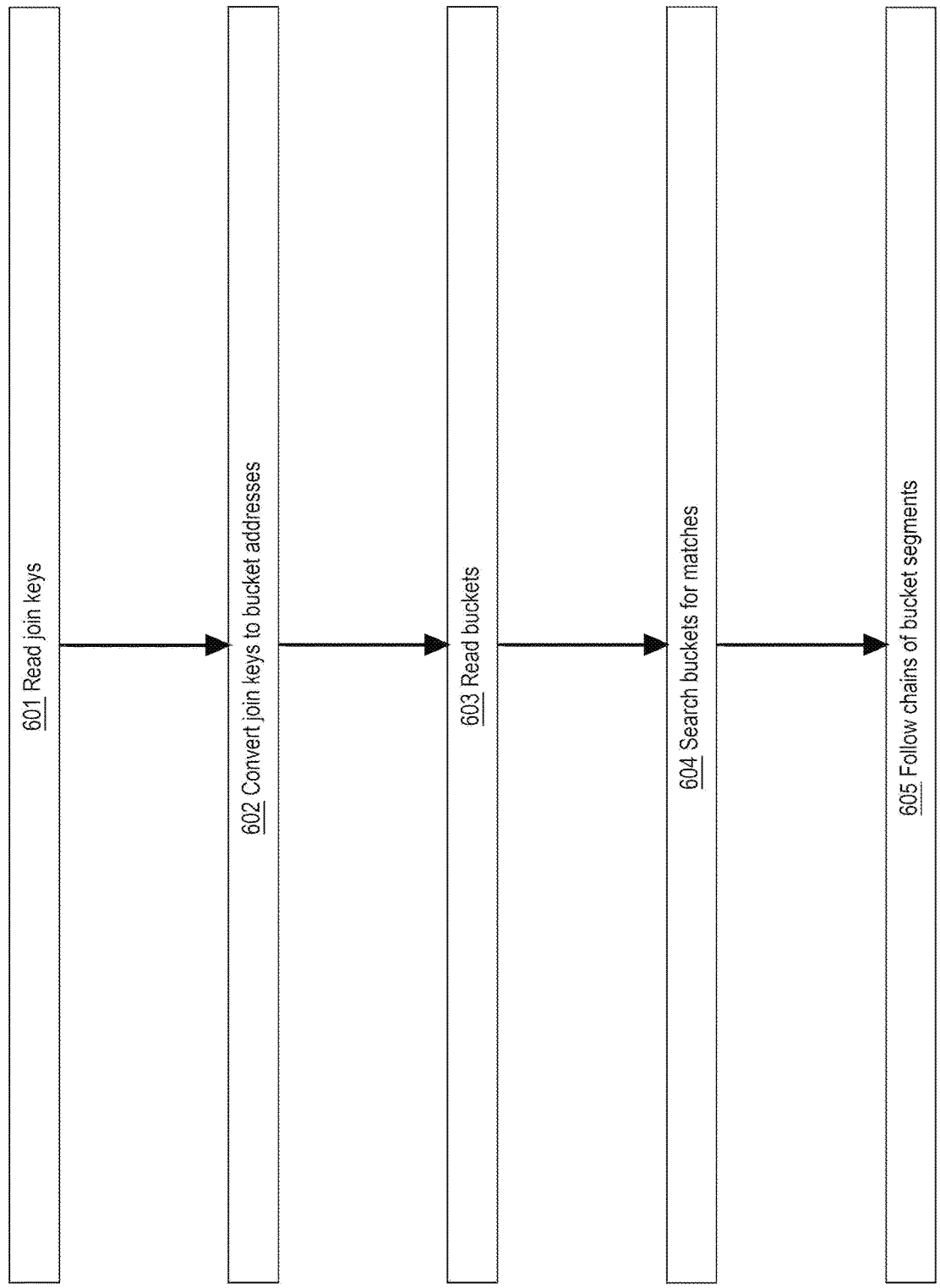
FIG. 6 is a flow diagram that depicts an example parallel process for accelerating probing and/or building

FIG. 6 is a flow diagram that depicts an example parallel process for accelerating probing and/or building that entails steps 601-605 as follows. FIG. 6 is discussed with reference to FIG. 1. Pseudocode for implementing the process of FIG. 6 is presented later herein.

A probe phase or build phase may have a multistage processing pipeline such that each stage processes a distinct respective stride of data in a distinct way. In an embodiment, steps 601-603 prefetch data for a next stride while steps 604-605 analyze data of a current stride such as follows. In an embodiment, some or all of steps 601-605 may scale by using SIMD instructions to concurrently process multiple objects of a same kind such as build key values, hash codes, or bucket addresses.

For demonstration, steps 601-605 are discussed without reference to strides and prefetching. Step 601 reads join key values by transferring them from main memory onto a call stack or operand stack or into CPU registers. Step 602 converts the join key values to bucket addresses. Step 603 retrieves buckets or respective first segments of buckets by transferring them from main memory onto a call stack or operand stack or into CPU registers.

Step 604 concurrently searches buckets for matches. For example, a same or different join key value or hash code may be concurrently compared to entries in multiple buckets such as all buckets or bucket segments in a same table segment of a hash table. Step 605 concurrently follows bucket segment chains for different buckets. For example, respective second bucket segments of separate buckets may be concurrently inspected, and subsequent bucket segments may be iteratively and concurrently inspected.

Explicit pipelining means that steps 601-603 are 'ahead' of 604-605 by a stride amount determined by the CPU and memory system characteristics, and a buffer in fast, local memory connects them. Also, steps 601-603 are parallel across buckets, as explained earlier, while step 4 is parallel within a bucket (but may be superscaled), and step 605 is serial (but may be superscaled).

The main consequence of the improved design is that very high rates of join lookups are achieved for a build phase and/or a probe phase, which minimizes the time required to execute joins.

9.1 Pseudocode of Probe Operation

Although a build phase occurs before a probe phase for a hash join, pseudocode for the probe phase is presented here before presenting pseudocode for the build phase, because the probe phase may be less complex than the build phase in some embodiments. The following pseudocode may implement a probe phase of a hash join.

```
/* To make this example tractable, a few simplifying assumptions are
   made:
       1. num_inputs is a multiple of READAHEAD
       2. Only one match per probe key is expected
   In the described system neither of these is true for all
   operation modes.
   Notation used:
       'A x N' is a vector at address A of length N
*/
/* Inputs: /
HashCode
input_hashes[ ]; Key
input_keys[ ];
int num_inputs;
/* Parameters: */
const int SIMD_WIDTH      /* width of a vector register /
const int READAHEAD   /* read latency, multiple of
SIMD_WIDTH / const int KEYS_PER_BUCKET /* number of keys in
each bucket */
/* Outer loop- process all inputs /
for base in 0..num_inputs step READAHEAD
   Bucket *ptrs[READAHEAD] /* Bucket type aliases to a vector
      register */
   /* first inner loop- 'Vertically' prefetch future probes, get bucket
      addresses for current probes, prefetch future bucket reads */
   for offset in 0..READAHEAD step SIMD_WIDTH
      /* prefetch( ) brings main memory into fast (cache) memory */
      /* here, the probe hashes and keys are prefetched /
      prefetch(&input_hashes[base + offset + READAHEAD] x
         SIMD_WIDTH);
      prefetch(&input_keys[base + offset + READAHEAD] x
         SIMD_WIDTH);
      ptrs[offset x SIMD_WIDTH] = hashcodes_to_bucket_addresses(
            &input_hashes[base + offset] x SIMD_WIDTH);
      /* here, the first buckets to be probed are prefetched
      */ for e in 0..SIMD_WIDTH
         prefetch(ptrs[offset + e] x SIMD_WIDTH)
```

```
/* second inner loop- 'Horizontally' read buckets, search for
     matches, store results /
for offset in 0..READAHEAD
    Key key = input_keys[(base + offset)]
    x 1] Bucket b = ptrs[(base + offset)
    x 1]
    loop
        parallel(e in
            0..KEYS_PER_BUCKET) if
            b.keys[e] == key
                output_match(b, e)
                continue to next
                    offset
        if b.chain
            b =
            b.chain
        else
            continue to next offset
```

9.2 Pseudocode of Build Operation

The following pseudocode may implement a build phase of a hash join.

```
/* To make this example tractable, a few simplifying assumptions are
     made:
     1. num_inputs is a multiple of READAHEAD
     2. Each key value leads to a list of its occurences
In the described system neither of these is true for all
operation modes.
Notation used:
     'A x N' is a vector at address A of length N
*/
/* Inputs: /
HashCode
input_hashes[ ] Key
input_keys[ ]
Value
input_values[ ]
int num_inputs
/* Parameters: */
const int SIMD_WIDTH   /* width of a vector register /
const int READAHEAD   /* read latency, multiple of
SIMD_WIDTH/ const int KEYS_PER_BUCKET /* number of keys in
    each bucket */
/* Outer loop- process all inputs /
for base in 0..num_inputs step READAHEAD
    Bucket *ptrs[READAHEAD] /* Bucket type aliases to a vector
        register */
    /* first inner loop- 'Vertically' prefetch future probes, get bucket
        addresses for current probes, prefetch future bucket reads */
    for offset in 0..READAHEAD step SIMD_WIDTH
        /* prefetch( ) brings main memory into fast (cache) memory */
        /* here, the probe hashes and keys are prefetched /
        prefetch(&input_hashes[base + offset + READAHEAD] x
            SIMD_WIDTH);
        prefetch(&input_keys[base + offset + READAHEAD] x
            SIMD_WIDTH);
        prefetch(&input_values[base + offset + READAHEAD] x
            SIMD_WIDTH);
        ptrs[offset x SIMD_WIDTH] = hashcodes_to_bucket_addresses(
            &input_hashes[base + offset] x SIMD_WIDTH);
        /* here, the first buckets to be probed are prefetched
        */ for e in 0..SIMD_WIDTH
            prefetch(ptrs[offset + e] x SIMD_WIDTH)
    /* second inner loop- 'Horizontally' read buckets, search for
        matches, store results /
    for offset in 0..READAHEAD
        Key key = input_keys[(base + offset) x 1]
        Value value = input values[(base + offset)
        x 1] Bucket b = ptrs[(base + offset) x 1]
        loop
            parallel(e in
                0..KEYS_PER_BUCKET) if
                b.keys[e] == key
                    add value_to_key(b, e,
                        value)
                    continue_to_next_offset
            if b.chain
                b =
                b.chain
            else
                add_new_key_with_value(key,
                    value) continue_to_next_offset
```

10.0 Example Data Map Selection

A hash join using a hash table as discussed extensively earlier herein is only one way to implement a relational join. Other ways to perform a join may use an associative data structure such as a data map that is not a hash table and does not use hashing. Thus a same join may have various alternative implementations based on various alternative data maps. Each kind of available data map may be specialized to optimize or otherwise handle a particular concern such as: join key value data type and/or size, possibility and/or handling of duplicates, memory demand, and speed. For example, a query plan optimizer may dynamically select a particular kind of data map to implement a join based on various concerns and conditions as discussed later herein.

Figure 7:
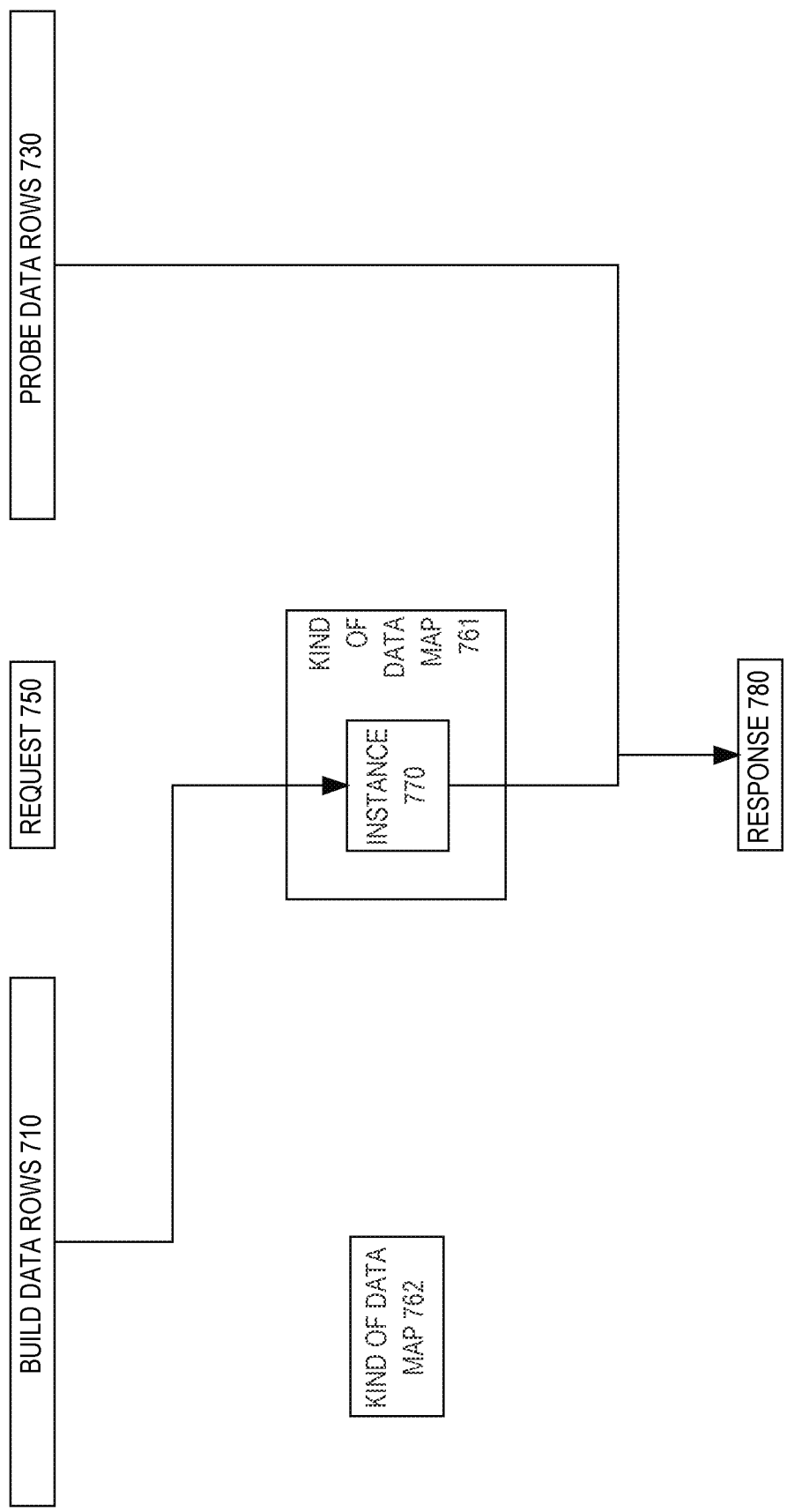
FIG. 7 is a block diagram that depicts an example computer that joins build and probe data rows and based on optimized selection of one from many kinds of data map.

FIG. 7 is a block diagram that depicts an example computer 700, in an embodiment. Computer 700 joins data rows 710 and 730 based on optimized selection of one from many kinds of data map. Computer 700 may be at least one rack server such as a blade, a personal computer, a mainframe, a virtual computer, or other computing device. When computer 700 comprises multiple computers, the computers are interconnected by a communication network. Computer 700 may be an implementation of computer 100.

Request 750 may specify or otherwise invoke a relational join between data rows 710 and 730. In an embodiment, execution of the join may rely on data structure(s) for match making of build data rows 710 to probe data rows 730. Herein, various kinds of data map such as 761-762 are used for such match making.

Kinds of data map 761-762 may be implemented with logic and metadata that may be operated as a template, class, prototype, or abstract data type (ADT) from which instance(s) may be generated. Kinds of data map 761-762 are implemented differently and perform differently. For example, various kinds of data map may be optimized in various respective ways for various respective concerns or resources such as initialization latency, modification latency, read latency, static or heap memory demand, and/or call and operand stack demand.

Various kinds of data map may be optimized in various respective ways for various respective accelerations such as hardware caching, data parallelism, inelastic horizontal scaling such as with a multicore central processing unit (CPU), elastic horizontal scaling, pipeline parallelism, and/or coprocessing such as by a graphical processing unit (GPU). Various kinds of data map may be optimized in various respective ways for various respective usages and/or biases such as data skew, database table scanning such as for online analytical processing (OLAP), and/or random access such as for online transactional processing (OLTP). Various kinds of data map may be optimized in various respective ways for various respective integration scenarios such as decomposition into lesser components such as parts of a compiled query operator and/or fusing of parts or whole query operators.

Various kinds of data map may be optimized in various respective ways for various respective aspects of requests such as request 750 such as database schema details such as aspects of table columns such as datatypes, value ranges, data constraints such as for referential integrity and distinctiveness. Various kinds of data map may be optimized in various respective ways for various respective database optimizations such as database indices, buffers and caches of database blocks, data compression and encoding, and/or in memory compression units (IMCU).

Thus, which one of many kinds of data map 761-762 should computer 700 use to execute request 750 may depend on static conditions such as hardware and software deployment and database configuration and schema. Selection of a kind of data map may also or instead depend on dynamic conditions such as details of request 750, contents of data rows 710 and/or 730, cache contents, and/or hardware workload. In any case, computer 700 compares static and dynamic conditions with strengths and weaknesses of various kinds of data map 761-762 to select special kind of data map 761 that is optimized for a current context or situation.

After selecting kind of data map 761, computer 700 generates instance 770 that is an instance of kind of data map 761. Instance 770 initially is an empty data map. Multiple instances of same kind of data map 761, such as instance 170, may be distinguishable from each other by context, configuration, and/or contents. For example, two same or different queries such as request 750 may be executed with respective instances of same or different respective kinds of data map.

In this example, build data rows 710 are used to populate instance 770. Instance 770 and probe data rows 730 are used for match making to fulfil the join. The join results are wholly or partially incorporated in or otherwise used to generate response 780 that answers request 750. For example, kind of data map 761 may be a hash table variant such as presented earlier herein and may be operated such as presented earlier herein. Various kinds of data map, some of which are hash table variants, are presented later herein.

As used herein, a kind of data map may or may not correspond to programing language idioms such as class, template, or prototype. Herein, a distinguishing feature between kinds of data map is that, once fully or partially populated, an instance of a kind of data map should not become an instance of a different kind of data map. For example, the instance does not support subtype migration such as for switching between different kinds of data map.

For example, when two different kinds of data map are variants that share a same implementation class, those two kinds may be distinguished by initial configuration such as by template parameters or constructor parameters, and values initially given for those parameters do not change during the lives of the respective instances of those kinds. For example, the only difference between two variants of a hash table may be a Boolean parameter that indicates something as mundane as whether or not the hash table will or will not occasionally rehash. If a DBMS that, for two instances respectively of those two variants, initially and statically assigns opposite Boolean values to an initialization parameter and will never subsequently toggle assignments for any instance, then approaches herein may treat those two variants as separate kinds of data map from which many instances may be generated.

11.0 Example Build Process

Figure 8:
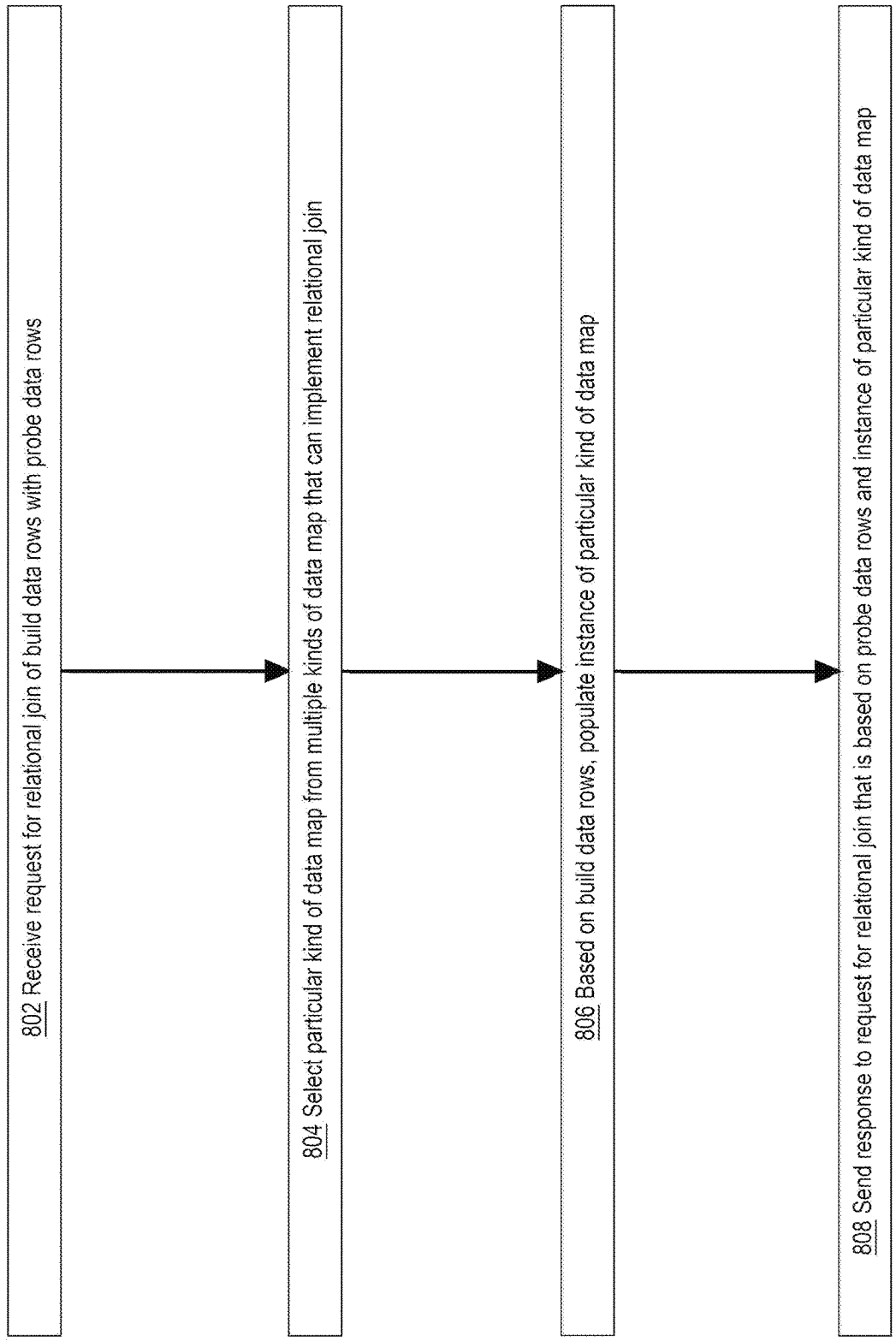
FIG. 8 is a flow diagram that depicts an example computer process that dynamically selects one of many kinds of data map for executing a relational join.

FIG. 8 is a flow diagram that depicts an example process of computer 700 that dynamically selects one of many kinds of data map for executing a relational join. FIG. 8 is discussed with reference to FIG. 7.

Step 802 receives request 750 that specifies or implies a relational join of data rows 710 and 730. For example, request 750 may be a CRUD command such as a DML statement such as SQL with ODBC.

Step 804 selects a particular kind of data map 761 from multiple kinds of data map 761-762 that can implement the relational join. Step 804 may, for example, involve comparing static and dynamic conditions, as discussed above, with strengths and weaknesses of various kinds of data map 761-762 to select special kind of data map 761 that is optimized for a current context or situation. Selection criteria and concerns are discussed later herein.

Based on build data rows 710, step 806 creates and populates data map instance 770 of selected kind of data map 761. For example, step 806 may entail a build phase as discussed earlier herein. When step 806 finishes, data map instance 770 is ready to use for match making.

Depending on the embodiment and scenario, data rows 710 and 730 may differ in semantics, format, and/or content but nonetheless be somewhat interchangeable respective data sets for joining. In an embodiment, computer 100 may decide which of those two data sets is used for step 806, and the other data set will be used for step 808.

Step 808 sends response 780 that answers request 750 based on probe data rows 730 and populated data map instance 770. For example, step 808 may entail a probe phase for match making as discussed earlier herein. For example, the join result may be a final result or an intermediate result for internal consumption for further execution of request 750 before step 808 sends response 780.

12.0 Example Configuration Concerns

Figure 9:
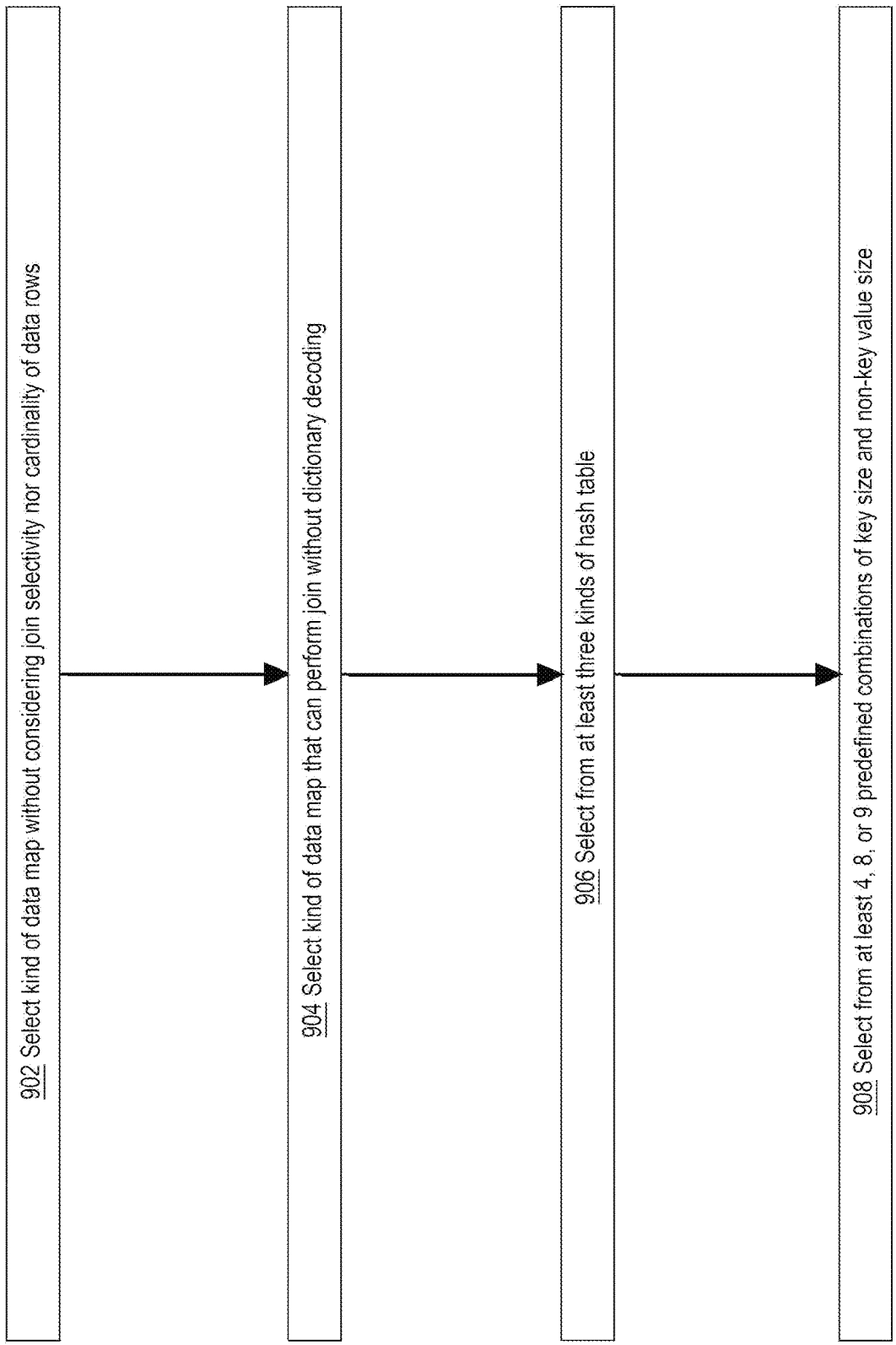
FIG. 9 is a flow diagram that depicts an example computer process that dynamically selects one of many kinds of data map for executing a relational join.

Before presenting FIG. 9, the following configurability discussion demonstrates data structures and formats from which robust and high-performance kinds of data map may be designed. With reference to FIG. 7, the following Tables 6-8 enumerate various design and implementation choices that may differ between different kinds of data map. Computer 700 may analyze, balance, and match these implementation choices to various kinds of data map when selecting an optimal kind of data map for a given context, situation, or conditions.

In some cases, a particular enumerated choice may cause some kinds of data map to be excluded during a selecting of an optimal kind of data map. In other cases, a particular enumerated choice may cause some kinds of data map such as kinds of hash table to be somewhat favored when selecting a kind of data map is cost based or weighted. For example, retaining duplicate build key values may exclude kinds of hash table whose buckets do not expand and/or favor kinds of hash table that use bucket segments.

In some cases, a particular enumerated choice may cause different instances, including instance 770, of the same kind of data map 761 to be differently configured. In some cases, the same enumerated choice may cause an instance of a kind of data map to be specially configured when one kind of data map is selected, but may not need instance configuration when a different kind of data map is instead selected. For example, some kinds of data map may be more configurable than others, and other kinds of data map may accommodate a wider range of scenarios without instance configuration.

Such flexibilities may also affect which kind of data map is selected in some cases. For example, one kind of hash table may include a universal hash function, while another kind of hash table may be excluded unless an application-specific hash function is provided for each instance. Likewise, another kind of hash table may be excluded unless the application specific hash function provides perfect hashing such that distinct join key values always cause distinct hash codes and collisions by distinct key values are impossible.

In previous Tables 2-5 presented earlier herein are additional enumerated choices that also may affect selection of a kind of data map and/or instance configuration. The following Table 6 enumerates example configuration concerns 931-934, some or all of which may be incorporated into kind(s) of data map in various embodiments.

| Configuration Concern | Meaning |
|---|---|
| 931 | Width of build key |
| 932 | Inclusion and/or size of non-key field(s) of build data rows |
| 933 | Duplicate build key values |
| 934 | Instance configuration does not affect bucket or segment size of hash table |

Configuration concerns 931-934 are generally presented as follows. Specific implementation choices for configuration concerns 931-934 are presented later herein.

The width of the build key is configuration concern 931. For example, whether or not a hash function should be applied to the build key value and whether or not a data map should directly store a build key value or a hash code may depend on build key size such as when a build key may be text.

Configuration concern 932 depends on whether or not additional data such as non-key fields of build data rows 710 should be retained by the data map, and whether or not the data map should directly store the additional data or instead store a pointer or array offset for indirect access to the additional data.

Configuration concern 933 depends on whether or not duplicate build key values are possible and/or significant. For example, detecting and/or retaining duplicates may impose temporal and/or spatial costs and/or structural complexity.

As discussed earlier and later herein, the data map may be a hash table that contains buckets and/or bucket segments. Configuration concern 934 provides a fixed size for buckets or segments even when selecting a kind of data map and/or configuring instance 770 depends on other concerns or scenarios. For example, kind of data map 761 may have a same fixed bucket segment size even though multiple instances, including instance 770, of same kind of data map 761 have different respective build key or hash code size. As discussed later herein, different sizes or included data to be stored in build key entries may cause different respective kinds of data map to be selected for use.

13.0 Example Bucket Arrangement

Different kinds of hash tables may have different arrangements of buckets. Indeed, some kinds of hash tables do not have buckets, which is the same as storing only one key entry per bucket by design, such as with cuckoo hashing, which is not the same as storing only one key entry per bucket segment.

In an embodiment, a bucket contains a segmented array that may dynamically gain additional segments to provide more or less unlimited capacity for the bucket to store build key entries. For example, duplicate build key values and/or collisions that map multiple distinct build key values to a same bucket may increase demand for the bucket's capacity.

As explained earlier herein, bucket segments may be pre-allocated in a pool, acquired on demand from the pool, and released back into the pool when instance 770 is discarded. In an embodiment, different instances of same or different kinds of data map share a same pool of spare segments. Acquisition from and later return to the pool are logical transitions that do not entail physical movement of a segment.

In other words, whether in use or not, segments physically remain stored in same respective locations of an array of segments that operates as a pool. In an embodiment, each segment in a pool may be identified based on the memory address or array offset of the segment. The address or offset may operate as a pointer to the segment such as when the segment occurs in a linked list of segments such as a segmented array for a bucket. For example a segment may contain a pointer to a next and/or previous segment in the linked list.

14.0 Example Bucket Content

The following Table 7 enumerates example bucket contents 941-943 for pipeline parallelism for increased throughput, some or all of which may be incorporated into kind(s) of data map in various embodiments.

| Bucket Content | Meaning |
|---|---|
| 941 | Do not store key values |
| 942 | Variable sized key values |
| 943 | Hash codes of key values |

Bucket content 941 excludes storage of key values in buckets such as when: a) hash collisions are impossible such as with perfect hashing, or b) key values are too large to directly store in a bucket. For example, text key values and compound key values need not be directly stored in the bucket, and the bucket may instead store address pointers or array offsets to such data.

For example, pointers may provide indirection to variable length text key values that may even be character large objects (CLOB). Other fixed size proxies for variable sized key values include hash codes and encoding dictionary codes. For example, bucket content 943 stores hash codes in a bucket.

When variable size key values have very limited size, such as a Unicode character or short text such as a stock ticker symbol, then bucket content 942 directly stores the key values inline in the bucket. Depending on the embodiment, variable sized short text that is inlined in a bucket may be null terminated, whitespace padded to a fixed size, or accompanied by an express size indicator such as a character count.

15.0 Bucket Chaining and Pooling

As discussed earlier herein, a bucket segment may have a multibyte aligned address. Because a physical segment may be an array of bucket segments, the physical segment may have a same address and alignment as the first bucket segment in the array. Also as discussed earlier herein, a multibyte aligned pointer has least significant bits that are always: zero, implied, not stored, and/or repurposed as bit field(s). Thus, a pointer to a bucket segment may be truncated The lock state is stored as a bit in the lower bits of the bucket segment pointers that daisy chain bucket segments of a same bucket into a linked list. For example, FIG. 4 shows that bucket segments 440 and 423 are chained together by bucket segment pointer NEXT.

Although bucket segment pointer NEXT points to bucket segment 423, bucket segment pointer NEXT is stored within bucket segment 440 as shown. The lock bit in NEXT indicates whether overflow bucket segment 423 is locked or unlocked. Likewise for another bucket, overflow bucket segments 421-422 as chained as shown by a bucket segment pointer that contains a lock bit that indicates whether overflow bucket segment 422 is locked or unlocked. For example, same or different computational threads may have multiple overflow bucket segments locked for same or different buckets, although different buckets should not share a same bucket segment.

In an embodiment, base pointers 0-3 have pointer bit fields that are similar to those of bucket segment pointers. For example, base pointer 1's lock bit indicates whether table segment 430 (and all of its buckets) is locked or unlocked. In an embodiment, table segment 430 has a bitmap that contains multiple respective lock bits for the buckets of table segment 430. Another bit of the lower bits of a bucket segment pointer records whether the overflow bucket segment pointed to has been initialized yet, which facilitates threading of initialization work.

In an embodiment, overflow bucket segments 410 is itself a segmented array that contains multiple pool segments as shown. Each pool segment contains an array of overflow bucket segments as shown. For example, overflow bucket segments 422-423 are in a same pool segment, but overflow bucket segment 421 is in a different pool segment. A bucket may contain multiple overflow bucket segments in same or different pool segments. For example, overflow bucket segments 421-422 are part of a same bucket but are in different pool segments. Likewise, overflow bucket segments 422-423 are in a same pool segment but in different buckets.

A bucket segment may fit into a hardware cache line. In an embodiment, a table segment and/or a pool segment may be a physical segment. A fixed size physical segment may contain multiple fixed size bucket segments. In an embodiment, a table segment and a pool segment have different respective fixed capacities as shown.

Obtaining a new physical segment may entail high latency memory allocation even though the fixed size of a physical segment may be the most efficient allocation size for a particular computer and operating system (OS). From a physical segment and with low latency, bucket segments may be allocated. For example, a physical segment may operate as a small pool of bucket segments. Likewise, there may be a pool of physical segments, which may be a pool of pools, such as overflow bucket segments 410 as shown that contains two pool segments that each are themselves a small pool of bucket segments.

As discussed earlier herein, a bucket segment may have a multibyte aligned address. Because a physical segment may be an array of bucket segments, the physical segment may have a same address and alignment as the first bucket segment in the array. Also as discussed earlier herein, a multibyte aligned pointer has least significant bits that are always: zero, implied, not stored, and/or repurposed as bit field(s). Thus, a pointer to a bucket segment may be a truncated pointer to a physical segment whose unused bits include at least an integer bit field that contains an array offset of the bucket segment within the physical segment, and there may still be unused bits for other bit fields. In an embodiment, the array offset bit field is additionally or instead contained in a hash code of a key entry that belongs in the bucket segment.

16.0 Second Exemplary Embodiment

FIG. 9 is a flow diagram that depicts an example process of a computer that dynamically selects one of many kinds of data map for executing a relational join. The following discussion of FIG. 9 describes an exemplary embodiment that demonstrates implementation choices that may be used with some or all of the embodiments presented earlier herein. Features of this exemplary embodiment are not requirements of the embodiments presented earlier herein.

The steps shown in FIG. 9 are different respective ways to select one of many kinds of data map for executing a relational join. In the shown embodiment, these steps occur in sequence to gradually exclude kinds of data map until one or few remain for final selection. In other embodiments, some or all of these steps are combined into a single step.

Various kinds of data map may be optimized in various respective ways for various respective usages and/or biases such as data skew, database table scanning such as for online analytical processing (OLAP), and/or random access such as for online transactional processing (OLTP). As observed earlier herein, it may be difficult or impossible to accurately predict join selectivity and build table cardinality, which may be crucial factors to estimate a data map's data distribution as a preface to establishing the data map's initial capacity and configuration.

Step 902 selects a kind of data map without considering join selectivity nor cardinality of build data rows. For example, step 902 may exclude kinds of data map that are unsuitable when selectivity and/or cardinality are unknown. Thus, step 902 tolerates data statistics that are missing or stale.

Step 904 selects a kind of data map that can facilitate match making of join key values that are dictionary encoded without needing decoding of the join key values. For example, join key values may be dictionary codes that can also be used as offsets into an array. For example, step 904 may select a kind of data map that is based on array(s).

In this exemplary embodiment, kinds of data map may include an array table in addition to various kinds of hash table. A hash table is typically indexed by the hash code of the join key value. Whereas, an array table is indexed by the encoding dictionary code of the join key value.

16.1 Size and Alignment

Before presenting step 906, size and alignment of a bucket or bucket segment may be integrated into various kinds of data map as follows and with reference to FIG. 4 as discussed earlier herein. Various kinds of data map may contain segmented buckets as discussed earlier herein. This exemplary embodiment has a multithreaded build phase in which each computational thread may temporarily and individually lock a bucket segment to prevent interference by other threads. For example, a bucket API may have subroutines to navigate a segmented bucket and to lock and unlock individual bucket segments. A thread should: only add build key entries to a bucket segment after locking the bucket segment, and unlock the bucket segment immediately afterwards.

This exemplary embodiment supports the following three kinds of hash tables:
  KDZK_KV_GENERIC: The key value itself is not stored in the bucket, but a part of its hash value is. Lookups are therefore inexact, but generally close to exact because the number of hash bits used is large. This mode is appropriate when the key values are complex and/or large, and the client is able to post-process the results to ensure exact matches. Duplicate key values are allowed.

KDZK_KV_GD: In this mode, the key value is always 4 bytes and is assumed to be nonzero, and key values may be encoding dictionary codes. The key value is stored in KV table 400, so lookups are exact. A hash value is still needed for lookups. Duplicate key values are allowed.

KDZK_KV_DIRECT: In this mode, the supplied key value is stored in KV table 400 as a length plus the bytes of the key value. Thus, the key value can vary in length. Lookups are exact, but a hash value is still needed for lookups. Duplicate key values are allowed.

Returning now to FIG. 9, step 906 selects one of at least three kinds of hash table, such as KDZK_KV_GENERIC, KDZK_KV_GD, and KDZK_KV_DIRECT.

As explained earlier herein, a bucket or bucket segment may contain a bucket segment pointer and an array of key entries. In various examples, a key entry may contain various components such as a key value and/or another value that may have various sizes. In various examples, a 64-byte bucket or bucket segment may be configured for various combinations of various components of various sizes.

Various examples may have build keys of various fixed sizes such as for numeric or string values. For example, a day-of-year key may be a two-byte integer. A month name key may have ten bytes that include: a) one byte that indicates string length as a character count and at most nine characters, or b) ten characters that include whitespace padding as needed.

The following Table 8 enumerates predefined configurations of buckets or bucket segments, with a separate kind of data map for each such configuration. Sizes and alignments are bytes. Because a size of a bucket segment pointer depends on whether the bucket segment pointer is implemented as a pointer or an offset as explained earlier herein, the implementation of the bucket segment pointer may affect a bucket or bucket segment's capacity to store key values and/or other values.

| Bucket Configuration | Key size | Value size | Number of key values for index-offset approach | Number of key values for memory pointer approach | Alignment of bucket or bucket segment |
| --- | --- | --- | --- | --- | --- |
| 1141 | 2 |   | 4 | 10 | 9 | 2 |
| 1142 | 2 | 8 | 6 | 5 | 2 |
| 1143 | 4 | 4 | 7 | 6 | 4 |
| 1144 | 4 | 8 | 5 | 4 | 4 |
| 1145 | 4 |   | 15 | 13 | 4 |
| 1146 | 6 |   | 10 | 9 | 2 |
| 1147 | 6 | 4 | 6 | 5 | 2 |
| 1148 | 6 | 8 | 4 | 3 | 2 |
| 1149 | 8 |   | 7 | 6 | 8 |
| 1154 | 8 | 4 | 5 | 4 | 4 |
| 1151 | 8 | 8 | 3 | 3 | 8 |
| 1152 | 10 | 4 | 4 | 3 | 2 |

Bucket configurations 1145-1146 and 1149 store key values but not other values in a bucket. Each of bucket configurations 1141-1152 may be used to configure a separate respective kind of data map such as a hash table. By key size, bucket configurations 1141-1152 provide five kinds of data map that have five respective key sizes of 2, 4, 6, 8, and 10 bytes. By value size, bucket configurations 1141-1152 provide three kinds of data map that have three respective value sizes of 4 or 8 bytes or no value stored. By bucket alignment, bucket configurations 1141-1152 provide three kinds of data map that have three respective alignments of 2, 4, and 8 bytes. Individually, bucket configurations 1141-1152 are twelve different kinds of data map.

Depending on the embodiment, each key entry contains a reference that is either an array offset or a pointer, shown in the above table respectively as index-offset approach and memory pointer approach, which are mutually exclusive embodiments for a given hash table. By amount of key entries per bucket segment with offsets into physical segments as bucket segment pointers, bucket configurations 1141-1152 provide seven kinds of data map that have seven respective bucket segment capacities of 3, 4, 5, 6, 7, 10, and 15 key entries. By amount of key entries per bucket segment with address pointers as bucket segment pointers, bucket configurations 1141-1152 provide six kinds of data map that have six respective bucket segment capacities of 3, 4, 5, 6, 9, and 13 key entries.

Resizing of KV table 400, such as for overflow or rebalance, is as follows. To increase the capacity of KV table 400, the segment index field is increased by extending n bits, which increases the number of segments of the hash table by $2^n$ times more.

The entries in one existing bucket are split into $2^n$ buckets. This resizing scheme minimizes the contention, thus one segment is doing resizing, and other segments are not blocked for insertion, thus resizing and insertion could be done in parallel.

17.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11g. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/WL is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

17.1 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
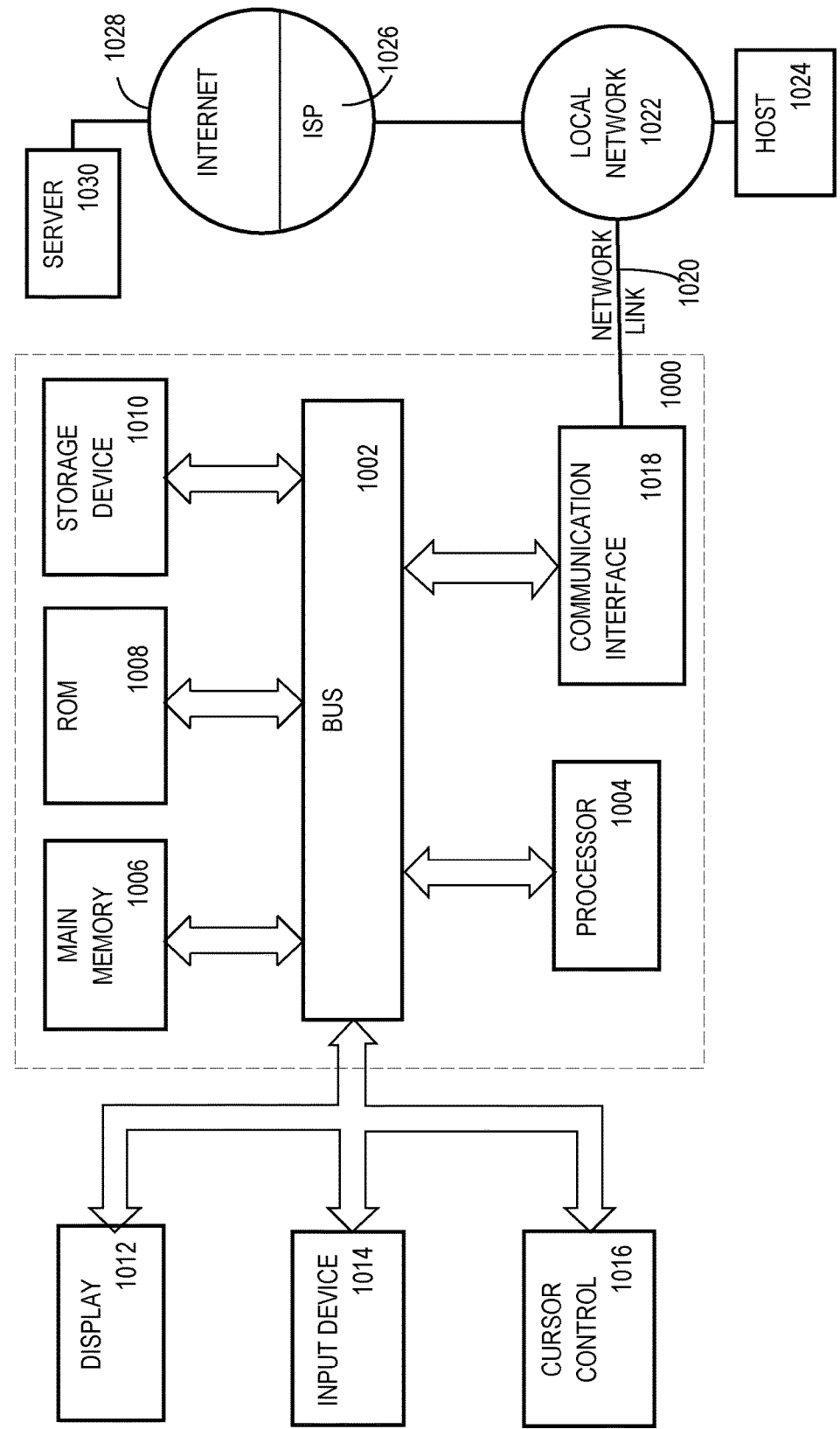
FIG. 10 is a block diagram that illustrates a computer system upon which an embodiment of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

Software Overview

Figure 11:
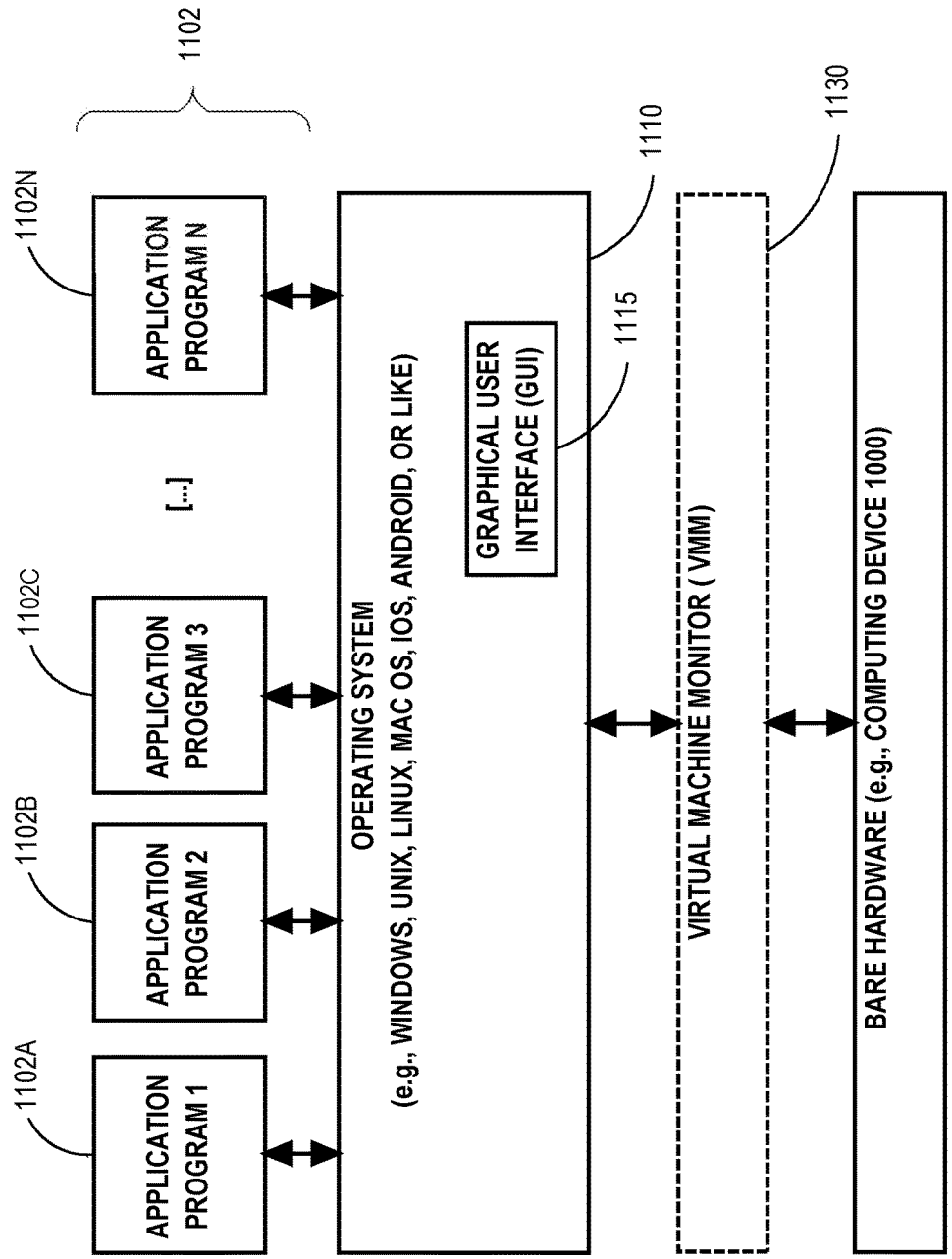
FIG. 11 is a block diagram that illustrates a basic software system that may be employed for controlling the operation of a computing system.

FIG. 11 is a block diagram of a basic software system 1100 that may be employed for controlling the operation of computing system 1000. Software system 1100 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1100 is provided for directing the operation of computing system 1000. Software system 1100, which may be stored in system memory (RAM) 1006 and on fixed storage (e.g., hard disk or flash memory) 1010, includes a kernel or operating system (OS) 1110.

The OS 1110 manages low-level aspects of computer operation, including managing execution of processes, memory allocation, file input and output (I/O), and device I/O. One or more application programs, represented as 1102A, 1102B, 1102C . . . 1102N, may be "loaded" (e.g., transferred from fixed storage 1010 into memory 1006) for execution by the system 1100. The applications or other software intended for use on computer system 1000 may also be stored as a set of downloadable computer-executable instructions, for example, for downloading and installation from an Internet location (e.g., a Web server, an app store, or other online service).

Software system 1100 includes a graphical user interface (GUI) 1115, for receiving user commands and data in a graphical (e.g., "point-and-click" or "touch gesture") fashion. These inputs, in turn, may be acted upon by the system 1100 in accordance with instructions from operating system 1110 and/or application(s) 1102. The GUI 1115 also serves to display the results of operation from the OS 1110 and application(s) 1102, whereupon the user may supply additional inputs or terminate the session (e.g., log off).

OS 1110 can execute directly on the bare hardware 1120 (e.g., processor(s) 1004) of computer system 1000. Alternatively, a hypervisor or virtual machine monitor (VMM) 1130 may be interposed between the bare hardware 1120 and the OS 1110. In this configuration, VMM 1130 acts as a software "cushion" or virtualization layer between the OS 1110 and the bare hardware 1120 of the computer system 1000.

VMM 1130 instantiates and runs one or more virtual machine instances ("guest machines"). Each guest machine comprises a "guest" operating system, such as OS 1110, and one or more applications, such as application(s) 1102, designed to execute on the guest operating system. The VMM 1130 presents the guest operating systems with a virtual operating platform and manages the execution of the guest operating systems.

In some instances, the VMM 1130 may allow a guest operating system to run as if it is running on the bare hardware 1120 of computer system 1100 directly. In these instances, the same version of the guest operating system configured to execute on the bare hardware 1120 directly may also execute on VMM 1130 without modification or reconfiguration. In other words, VMM 1130 may provide full hardware and CPU virtualization to a guest operating system in some instances.

In other instances, a guest operating system may be specially designed or configured to execute on VMM 1130 for efficiency. In these instances, the guest operating system is "aware" that it executes on a virtual machine monitor. In other words, VMM 1130 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving a request for a relational join of a build plurality of data rows with a probe plurality of data rows;
selecting, based on the request for the relational join, a particular kind of data map from a plurality of kinds of data map that can be used for said relational join of said build plurality of data rows with said probe plurality of data rows, wherein:
the plurality of kinds of data map includes a first kind of data map and a second kind of data map,
the first kind of data map does not store a build key,
the first kind of data map stores values that have a first size,
the second kind of data map stores values that have a second size that is not the first size;
populating, based on the build plurality of data rows, the particular kind of data map; and
sending a response to the request for the relational join that is based on the probe plurality of data rows and the particular kind of data map;
wherein the method is performed by one or more computers.

2. The method of claim 1 wherein said selecting the particular kind of data map does not entail join selectivity nor cardinality of the build plurality of data rows.

3. The method of claim 1 wherein the plurality of kinds of data map includes at least three kinds of hash table.

4. The method of claim 1 further comprising configuring the particular kind of data map for a size of a non-key value of the build plurality of data rows.

5. The method of claim 4 wherein said configuring the particular kind of data map comprises selecting from a plurality of at least three non-key value sizes.

6. The method of claim 4 wherein:
the particular kind of data map is a hash table;
said configuring the particular kind of data map does not affect a bucket size of the hash table.

7. The method of claim 1 wherein:
the particular kind of data map is a hash table that contains a bucket that contains a segmented array that contains a full segment;
the method further comprises the full segment overflowing into a spare segment that is identified based on at least one selected from the group consisting of: a memory address of the spare segment and a position of the spare segment within a pool of segments.

8. The method of claim 1 wherein:
the particular kind of data map is a hash table that contains a plurality of buckets;
each bucket of the plurality of buckets is configured according to at least one selected from the group consisting of:
the bucket and a respective hardware cache line of a first plurality of hardware cache lines have a same memory address alignment, and
the bucket has a first size that is not greater than a second size of a respective hardware cache line of a second plurality of hardware cache lines.

9. The method of claim 1 wherein:
the first kind of data map is a hash table that contains a plurality of buckets;
the first kind of data map is configured for the plurality of buckets to store hash codes of the build key.

10. The method of claim 1 wherein:
the particular kind of data map is a hash table that contains a plurality of buckets;
executing the relational join comprises applying a SIMD instruction to a bucket of the plurality of buckets.

11. The method of claim 1 wherein:
the particular kind of data map accepts an encoding dictionary code as a lookup key;
executing the relational join does not entail dictionary decoding.

12. One or more non-transitory computer-readable media storing instructions that, when executed by one or more processors, cause:
receiving a request for a relational join of a build plurality of data rows with a probe plurality of data rows;
selecting, based on the request for the relational join, a particular kind of data map from a plurality of kinds of data map that can be used for said relational join of said build plurality of data rows with said probe plurality of data rows, wherein:
the plurality of kinds of data map includes a first kind of data map and a second kind of data map,
the first kind of data map does not store a build key,
the first kind of data map stores values that have a first size,
the second kind of data map stores values that have a second size that is not the first size;
populating, based on the build plurality of data rows, the particular kind of data map; and
sending a response to the request for the relational join that is based on the probe plurality of data rows and the particular kind of data map.

13. The one or more non-transitory computer-readable media of claim 12 wherein said selecting the particular kind of data map does not entail join selectivity nor cardinality of the build plurality of data rows.

14. The one or more non-transitory computer-readable media of claim 12 wherein the plurality of kinds of data map includes at least three kinds of hash table.

15. The one or more non-transitory computer-readable media of claim 12 wherein the instructions further cause configuring the particular kind of data map for a size of a non-key value of the build plurality of data rows.

16. The one or more non-transitory computer-readable media of claim 12 wherein:
the particular kind of data map is a hash table that contains a bucket that contains a segmented array that contains a full segment;
the instructions further cause the full segment overflowing into a spare segment that is identified based on at least one selected from the group consisting of: a memory address of the spare segment and a position of the spare segment within a pool of segments.

17. The one or more non-transitory computer-readable media of claim 12 wherein:
the particular kind of data map is a hash table that contains a plurality of buckets;
each bucket of the plurality of buckets is configured according to at least one selected from the group consisting of:
the bucket and a respective hardware cache line of a first plurality of hardware cache lines have a same memory address alignment, and
the bucket has a first size that is not greater than a second size of a respective hardware cache line of a second plurality of hardware cache lines.

18. The one or more non-transitory computer-readable media of claim 12 wherein:
the particular kind of data map is a hash table that contains a plurality of buckets;

the particular kind of data map is configured for the plurality of buckets to store hash codes of the build key.

19. The one or more non-transitory computer-readable media of claim 12 wherein:

the particular kind of data map is a hash table that contains a plurality of buckets;

executing the relational join comprises applying a SIMD instruction to a bucket of the plurality of buckets.

20. The one or more non-transitory computer-readable media of claim 12 wherein:

the particular kind of data map accepts an encoding dictionary code as a lookup key;

executing the relational join does not entail dictionary decoding.

* * * * *